United States Patent
Montgomery et al.

(10) Patent No.: US 7,837,330 B2
(45) Date of Patent: Nov. 23, 2010

(54) PANORAMIC THREE-DIMENSIONAL ADAPTER FOR AN OPTICAL INSTRUMENT AND A COMBINATION OF SUCH AN ADAPTER AND SUCH AN OPTICAL INSTRUMENT

(75) Inventors: David James Montgomery, Bampton (GB); Graham Roger Jones, Faringdon (GB)

(73) Assignee: Sharp Kabushiki Kaisha, Osaka (JP)

( * ) Notice: Subject to any disclaimer, the term of this patent is extended or adjusted under 35 U.S.C. 154(b) by 516 days.

(21) Appl. No.: 11/911,354

(22) PCT Filed: Apr. 18, 2006

(86) PCT No.: PCT/JP2006/308505

§ 371 (c)(1),
(2), (4) Date: Oct. 12, 2007

(87) PCT Pub. No.: WO2006/112536

PCT Pub. Date: Oct. 26, 2006

(65) Prior Publication Data

US 2009/0034086 A1    Feb. 5, 2009

(30) Foreign Application Priority Data

Apr. 18, 2005 (GB) .................................. 0507783.9

(51) Int. Cl.
*G02B 27/14* (2006.01)
(52) U.S. Cl. ............................. 353/7; 359/402; 359/403
(58) Field of Classification Search .................. 353/7; 359/402, 403
See application file for complete search history.

(56) References Cited

U.S. PATENT DOCUMENTS 3,505,465 A    4/1970    Rees (Continued)

FOREIGN PATENT DOCUMENTS

EP    0 989 436 A2    3/2000

(Continued)

OTHER PUBLICATIONS

International Search Report for corresponding Application No. PCT/JP2006/308505 mailed Nov. 11, 2006.

(Continued)

*Primary Examiner*—Seung C Sohn
(74) *Attorney, Agent, or Firm*—Renner, Otto, Boisselle & Sklar, LLP

(57) ABSTRACT

An adapter is provided for adapting an optical instrument, such as a camera (3) or a projector, to capture or display panoramic three-dimensional images. The adapter comprises a plurality of mirrors (1a, 1b, 1c), each of which has a reflective surface which is in the shape of a curved non-circular conic section rotated about an axis of symmetry (15a, 15b, 15c). The reflective surfaces have first foci which are spaced perpendicularly from a longitudinal axis of the adapter and which are angularly spaced around the longitudinal axis. For example, the conic section may be a hyperbola with first foci equidistantly spaced from the longitudinal axis and equiangularly spaced around 15b the longitudinal axis. The axes of symmetry (15a, 15b, 15c) of the mirrors (1a, 1b, 1c) converge to intersect the longitudinal axis at a point which is coincident with the front principal point of, for example, a camera lens (12). Thus, single shot capture of all the image data for the or each panoramic three-dimensional image may be performed.

25 Claims, 18 Drawing Sheets

U.S. PATENT DOCUMENTS

| | | | |
|---|---|---|---|
| 6,157,018 | A | 12/2000 | Ishiguro et al. |
| 6,347,010 | B1 * | 2/2002 | Chen et al. ............... 359/402 |
| 6,897,883 | B1 | 5/2005 | Kumata et al. |
| 2002/0126395 | A1 | 9/2002 | Gianchandani et al. |
| 2003/0043261 | A1 | 3/2003 | Gianchandani et al. |
| 2003/0053080 | A1 | 3/2003 | Gianchandani et al. |

FOREIGN PATENT DOCUMENTS

| | | |
|---|---|---|
| JP | 11-095344 | 4/1999 |
| JP | 11-174603 | 7/1999 |
| JP | 2001-333303 | 11/2001 |
| JP | 2002-271661 | 9/2002 |
| JP | 2003-121745 | 4/2003 |
| WO | 2001/071423 | 9/2001 |
| WO | 03/054625 | 7/2003 |

OTHER PUBLICATIONS

PCT/ISA/237for International Application No. PCT/JP2006/308505.

British Search Report for corresponding Application No. 0507783.9 dated Jun. 28, 2005.

J.S. Chahl et al.; "Reflective Surfaces for Panoramic Imaging"; Applied Optics; vol. 36, No. 31, Nov. 1, 1997; pp. 8275-8285.

George G. Barton et al.; "Static Omnidirectional Stereoscopic Display System"; Part of SPIE Conference on "Three-Dimensional Imaging, Optical Metrology, and Inspection V"; SPIE, vol. 3835; Sep. 1999; pp. 84-92.

Shmuel Peleg et al.; "Omnistereo: Panoramic Stereo Imaging"; IEEE Transactions on Pattern Analysis and Machine Intelligence; vol. 23, No. 3; Mar. 2001; pp. 279-290.

S.K. Nayar et al.; "Folded Catadioptric Cameras"; in "Panoramic Vision"; Springer; 2001; pp. 103-119.

H. Ishiguro; "Development of Low-Cost Compact Omnidirectional Vision Sensors", in "Panoramic Vision"' Springer; 2001; pp. 23-38.

* cited by examiner

F I G. 1 6 (a)
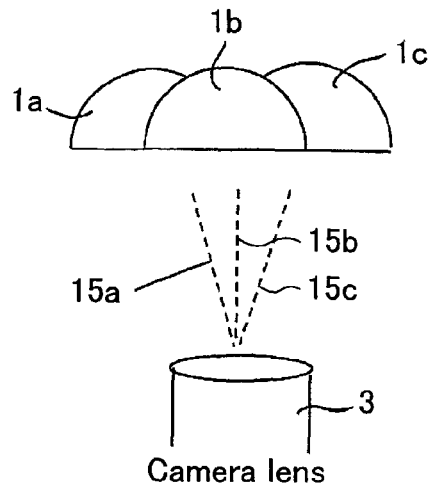
F I G. 1 6 (b)
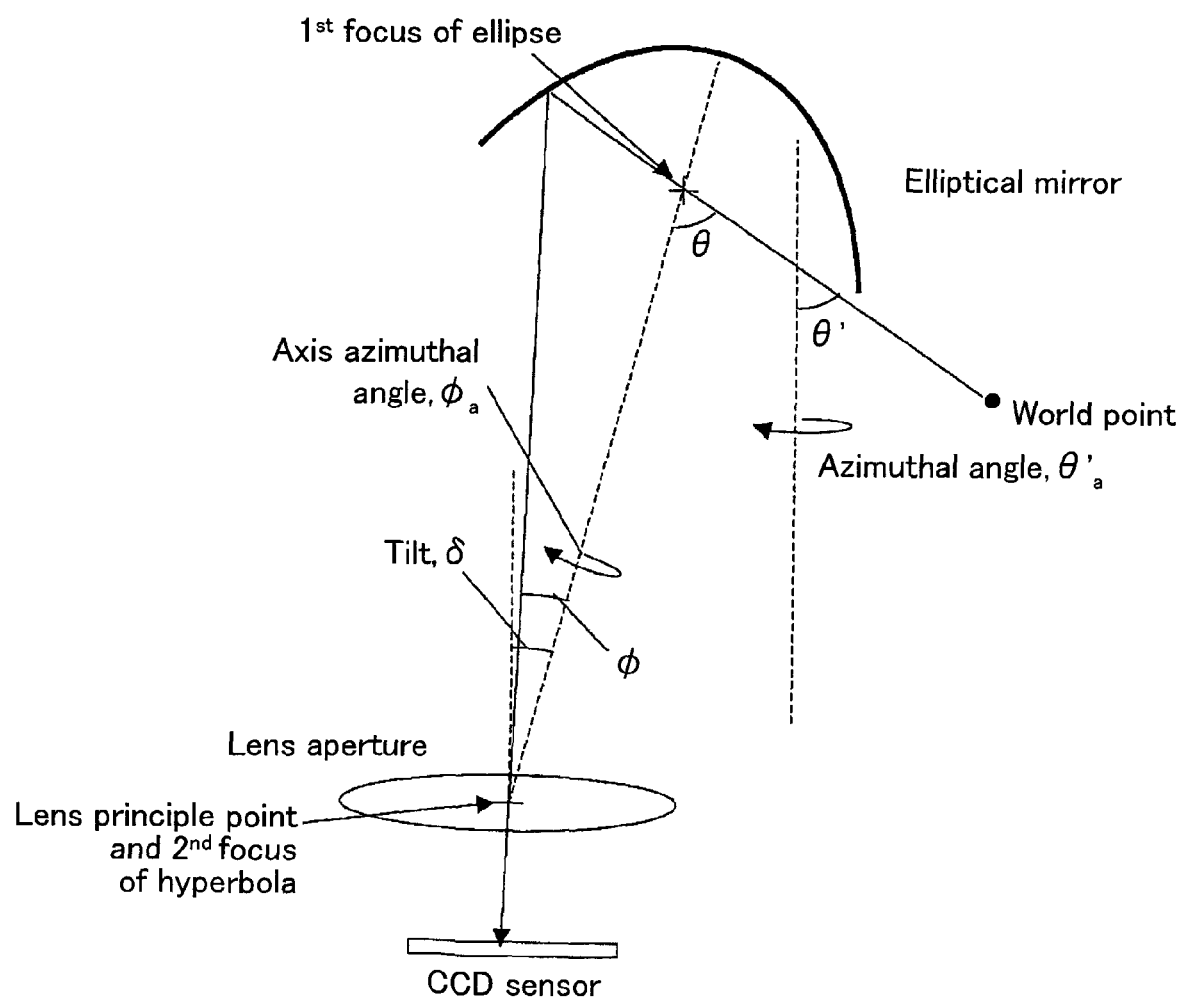

FIG. 17 (a)  FIG. 17 (b)
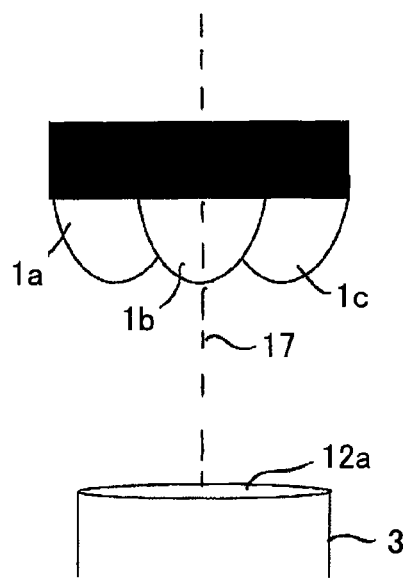
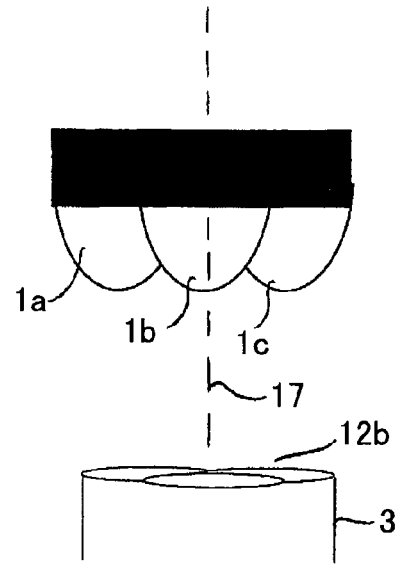
FIG. 18
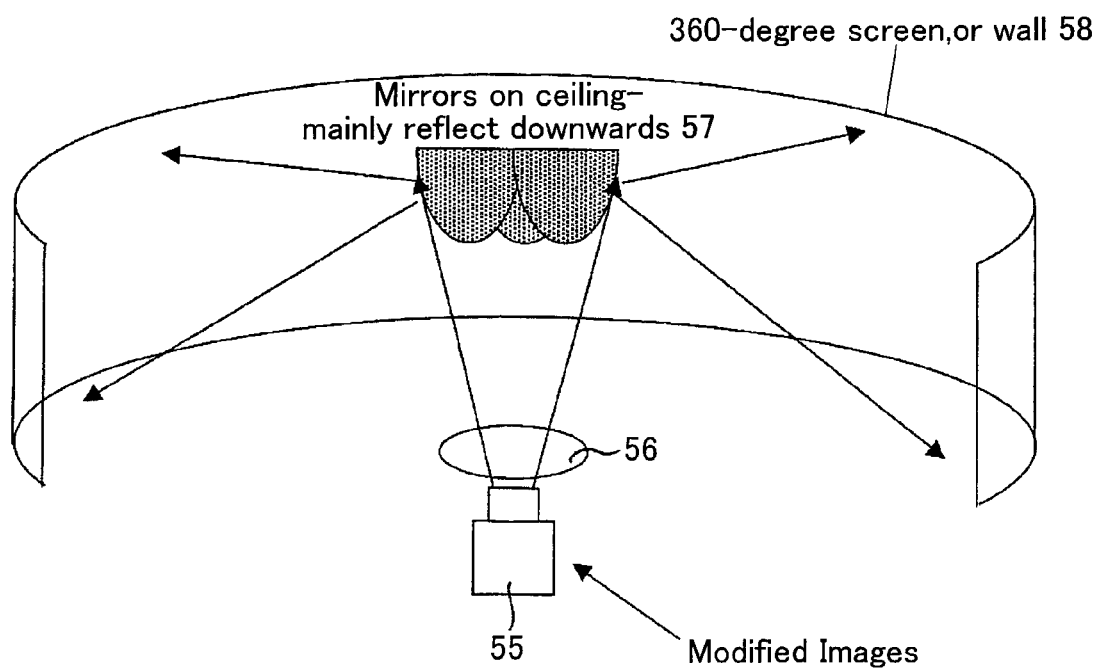

FIG. 19 (a)
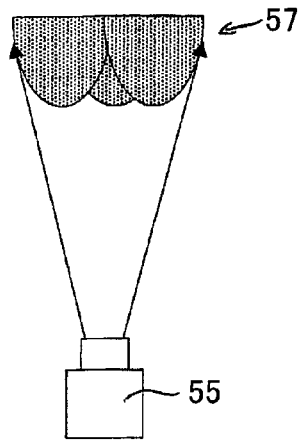
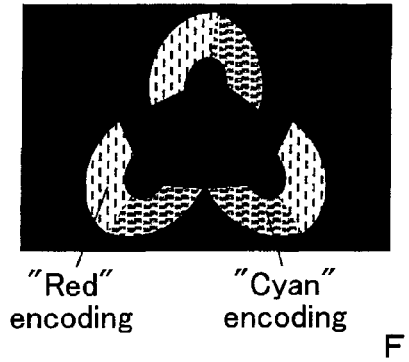
"Red" encoding    "Cyan" encoding
FIG. 19 (b)
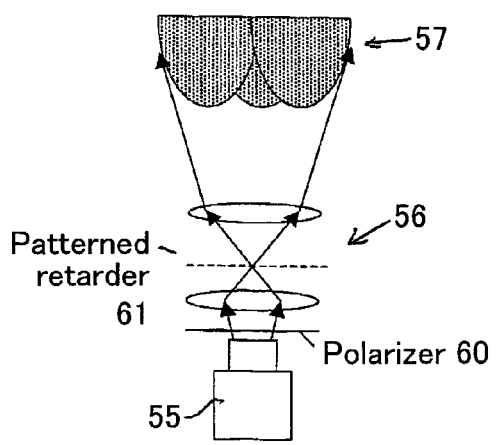
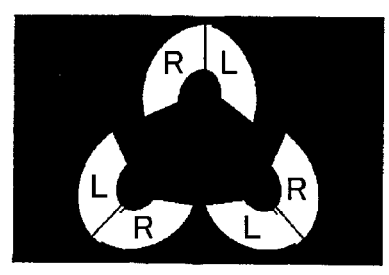
FIG. 19 (c)
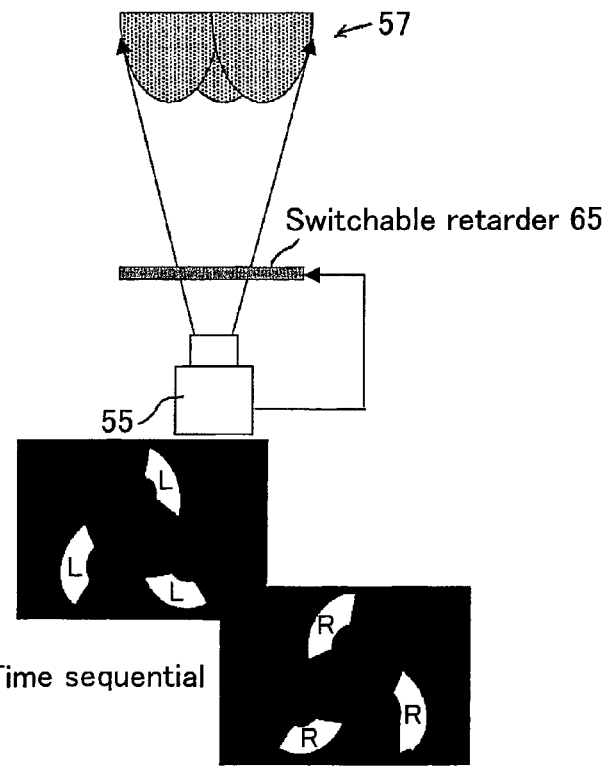
Time sequential

PANORAMIC THREE-DIMENSIONAL ADAPTER FOR AN OPTICAL INSTRUMENT AND A COMBINATION OF SUCH AN ADAPTER AND SUCH AN OPTICAL INSTRUMENT

TECHNICAL FIELD

The present invention relates to a panoramic three-dimensional (3D) adapter for an optical instrument and a combination of such an adapter and such an optical instrument. For example, such an optical instrument may comprise a camera which, when including or mounted to such an adapter, may be used as a stereoscopic panoramic camera. As an alternative, the optical instrument may comprise a projector which, when mounted to or including such an adapter, may be used to form a panoramic stereoscopic projection display.

BACKGROUND ART

There are several known types of wide field or panoramic stereoscopic cameras. A first type uses a plurality of cameras, usually a multiple of 6 cameras, disposed in a circular or spherical arrangement. Such an arrangement typically provides good quality images but is complex and expensive to set up. Also, because several cameras are used to capture the images, there may be brightness and matching errors when the panoramic stereoscopic images are constructed from the individually captured images. Such a problem is typical of any multiple camera system, whether 2D or 3D, in which images captured by different cameras are combined together to form a composite image.

It is also possible to generate panoramic stereoscopic images using a rotating head camera of well-known type. Such an arrangement is capable of providing good results but a significant amount of computer processing of the captured images is necessary in order to provide stereoscopic viewing. Also, because of the nature of such a rotating head camera, different vertical slices of the image are captured at different times and this may result in substantial visible errors if there is any significant movement in the scene or object whose image is being captured.

Another known type of stereoscopic camera arrangement makes use of wide angle lens systems such as "fisheye" lenses. However, such arrangements generally require more than one camera in order to provide a full panoramic view. Also, the resolution of the captured images is generally relatively low.

A known type of 2D system of the "catadioptric" type uses a conic section mirror, generally disposed above a camera, which may be of the "emulsion" or "opto-electric" type and which may capture still or moving images. U.S. Pat. No. 3,505,465 discloses an arrangement of this type for providing a full 360° panoramic 2D view, for example for use by tank commanders. As shown in FIG. 1 of the accompanying drawings, the reflecting surface 2 of a conic mirror 1 is axially symmetric around a vertical axis and is in the shape of a surface of rotation based on a hyperbolic section. The mirror 1 is disposed above a video camera 3 so that the axis of symmetry of the mirror 1 coincides with the optical axis of the camera 3.

The image captured by the camera 3 can be processed by means of a coordinate transformation, for example, as described hereinafter, to provide a 360° 2D panoramic image of the scene, for example around the tank. However, such an arrangement is only capable of providing 2D image capture.

Applied Optics, Vol 36, No 31, 1 Nov. 1997, pages 8275-8285, J. S. Chahl et al, "Reflective Surfaces for Panoramic Imaging" discloses another 2D arrangement in which a mirror is disposed above a camera. The mirror is circularly symmetrical about a vertical axis with a dimple on the vertical axis. This reduces the effect caused by the camera obscuring the field of view below the mirror.

EP0989436 discloses a panoramic 3D camera arrangement comprising facetted plane mirrors cooperating with a plurality of separate cameras. As shown in FIG. 2 of the accompanying drawings, the facetted mirror 1 has the shape of a pyramid, whose base is a regular polygon having any desired number of sides. The group of cameras 3 is arranged such that, for each facet, at least two of the cameras 3 capture homologous images from a direction defined by the orientation of the cooperating facet. A full panoramic 3D image may then be formed by "stitching" the individual images together. However, such an arrangement using multiple cameras 3 has the difficulties and problems of matching, synchronisation and alignment as mentioned hereinbefore. Also, the relatively large non-symmetric mirror arrangement 1 is bulky and relatively expensive.

JP11095344 discloses an arrangement similar to that disclosed in EP0989436. However, the arrangement differs in that a single camera is directed towards each facet and each facet is split and angled so that the corresponding camera captures slightly different views from the direction defined by the facet.

JP11095344 also discloses an arrangement as illustrated in FIGS. 3(a) and 3(b) of the accompanying drawings. This arrangement comprises a single camera 3 pointing upwardly along the axis of symmetry of a mirror having two separate "conic" sections 3a and 3b. The conic sections are of the same type, for example hyperbolic, but are of different sizes and shapes and are spaced apart vertically and connected together by a section 4 which has no optical function. The camera 3 thus capture a composite image in the form of two circular areas for images reflected from the sections 3a and 3b.

The foci of the two conic mirror sections 3a and 3b are separate in space and this provides a stereo baseline from which a 3D panoramic image may be extracted. However, because the separation between the mirrors is vertical rather than horizontal, the disparity between the separate images is vertical and does not provide a horizontal baseline to permit horizontal stereoscopically related images to be extracted directly. In order to correct this and to provide stereoscopic images with horizontal disparity, additional processing including feature matching has to be performed. Such processing can be unreliable and may leave dark areas in the final images where there is no image data. Also, the captured images are of different sizes and resolutions and are therefore difficult to process together without loss of resolution or loss of quality.

WO03/054625 discloses a 3D camera arrangement as shown in FIGS. 4(a) to 4(c) of the accompanying drawings. This arrangement uses three catadioptric cameras 3a, 3b and 3c of the type shown in FIG. 6 of the accompanying drawings. The cameras are arranged at the apices of an equilateral triangle and have effective fields of view for image capture illustrated at 5a, 5b and 5c limited by the positions of the cameras. A system of this type is also disclosed by Barton et al, Proc SPIE vol. 3835, "Three-dimensional imaging, optical metrology, and inspection V", 1999, p.84-92. However, such an arrangement requires three cameras and has the problems of the optical system matching, synchronisation and alignment as mentioned hereinbefore and, again, is difficult to set up.

Peleg et al, IEEE Transactions on Patent Analysis and Machine Intelligence, vol. 23 no. 3, March 2001, p. 279-90 ISSN: 0162-8828 discloses another technique for capturing panoramic stereoscopic images as illustrated in FIG. 5 of the accompanying drawings. This document is mainly concerned with using rotating panoramic cameras and simulations thereof. One of the disclosed techniques uses spiral shaped mirror 1a acquiring right eye circular projection P1 and spiral shaped mirror 1b acquiring left eye circular projection P2 for use with a single camera to provide capture of a wide field stereoscopic composite image. However, such a mirror arrangement is difficult to make and it is not possible to provide a full 360° panoramic view in a single shot.

DISCLOSURE OF INVENTION

According to a first aspect of the invention, there is provided a panoramic three-dimensional adapter for a single optical instrument, comprising a plurality of mirrors, each of which has a reflective surface whose shape is at least part of the shape formed by rotating a curved non-circular conic section about an axis of symmetry and which has a first focus, each first focus being spaced perpendicularly from a longitudinal axis of the adapter, the first foci being angularly spaced around the longitudinal axis.

According to a second aspect of the invention, there is provided a panoramic three-dimensional adapter for a single optical instrument, comprising a plurality of mirrors, each of which has a reflective surface whose shape is at least part of the shape formed by rotating a curved non-circular conic section about an axis of symmetry and which has a first focus, each first focus being spaced perpendicularly from a longitudinal axis of the adapter, the first foci being angularly spaced around the longitudinal axis, the axes of symmetry of the mirrors being non-coaxial.

According to a third aspect of the invention, there is provided a panoramic three-dimensional adapter for use with a single optical instrument, the adapter having a longitudinal axis which is coaxial with an optical longitudinal axis of the instrument when the adapter is used with the instrument, the adapter comprising a plurality of mirrors, each of which has a reflective surface, whose shape is at least part of the shape formed by rotating a curved non-circular conic section about an axis of symmetry, and a first focus, the first foci being angularly spaced around the longitudinal axis of the adapter such that each of the mirrors is in a field of view of the instrument when the adapter is used with the instrument, the mirrors being positioned such that, extending from every point in a three-dimensional region of non-zero volume, there exist at least two straight lines passing through respective ones of the first foci and intersecting for the first time respective ones of the mirror surfaces corresponding to the first foci.

The reflective surfaces may have substantially the same shapes.

The reflective surfaces may have substantially the same sizes.

The first foci may be disposed in a common plane extending perpendicularly to the longitudinal axis.

The first foci may be spaced by substantially the same distance from the longitudinal axis.

The first foci may be substantially equiangularly spaced around the longitudinal axis.

The axes of symmetry may converge towards the longitudinal axis. The axes of symmetry may intersect the longitudinal axis substantially at a common point. The common point may be arranged substantially to coincide with the front principal point of a lens of the optical instrument when the adapter is mounted to the instrument. Each of the mirrors may have a convex substantially hyperboloidal reflective surface. As an alternative, each of the mirrors may have a concave substantially ellipsoidal reflective surface. The reflective surface may have a second focus substantially at the common point.

The axes of symmetry may be substantially parallel to the longitudinal axis. Each of the mirrors may have a convex substantially paraboloidal reflective surface.

The adapter may comprise a substantially non-reflective shield behind the mirrors.

Each of the mirrors may have an edge which extends further from an apex of the reflective surface at a point of the edge furthest from the longitudinal axis than at least one other point of the edge. The edge of each mirror may be in a plane which is non-perpendicular to the axis of symmetry.

Each of the mirrors may be spaced from the or each other mirror. Each mirror may be spaced from the or each adjacent mirror by a distance substantially equal to the mirror radius at the edge thereof.

The adapter may comprise three mirrors.

The adapter may comprise four mirrors.

The adapter may comprise a mounting for mounting the adapter to the instrument and connected to the mirrors by a rod extending along the longitudinal axis. The mounting may comprise a plurality of spokes radiating from an end of the rod. The number of spokes may be equal to the number of mirrors. Each plane containing a first focus and the longitudinal axis may substantially bisect the angle between an adjacent pair of spokes.

The adapter may comprise a mounting, for mounting the adapter to the instrument, connected to the mirrors by a substantially transparent cylinder containing the mirrors. The adapter may comprise a substantially non-reflective spike extending along the axis of symmetry from each mirror.

An unused part of each reflective surface may be substantially non-reflective.

According to a fourth aspect of the invention, there is provided a combination of an adapter according to any of the first to third aspects of the invention and a single optical instrument.

The adapter may form part of the instrument.

The instrument may comprise a camera. The camera may comprise a single lens system. The camera may comprise a single light-sensitive surface.

The combination may comprise a processor for performing a coordinate transformation of the image at the light-sensitive surface to a three-dimensional coordinate frame which is non-coincident with the axes of symmetry. The coordinate frame may be a spherical coordinate frame. The coordinate frame may be an average of the axes of symmetry.

The instrument may comprise a projector.

The projector may be arranged to perform anaglyph encoding of left and right images.

It is thus possible to provide an arrangement which is capable of capturing or projecting a panoramic stereoscopic image or sequence of images. In many embodiments, a full 360° horizontal panorama may be captured or projected. Such an arrangement is of the "single shot" type requiring only a single lens or optical system and a single sensor, emulsion film frame, or image generation system so that no optics matching or sensitivity matching is required. Simultaneous homologous images are captured for a full 360° panorama so that, for example, still images of moving scenes may be captured without loss of quality. A camera having this feature is suitable for still recording and video recording.

Homologous images of substantially identical sizes and resolution may be captured. Where the system is used to capture horizontal panoramic images, the system is such that only horizontal disparities are present so that no potentially unreliable feature matching or similar processing is required. Instead, global "unwrapping equations" may be used and these are more easily "hard-wired" and are more applicable to "video scenes". Global unwrapping equations do not depend on distance or size of an object in a scene and may be used because of the single viewpoint condition, which is a consequence of using conic section mirrors. Thus, no object-dependent unwrapping is required so that no object recognition is required.

It is possible to provide a relatively simple adapter, which may be used with any standard camera for capturing still or moving images using emulsion film or opto-electronic sensors, for example in high resolution digital cameras or camcorders. Also, a similar or the same adapter may be used with a projector for projecting stereoscopic images to provide panoramic displays. However, the "adapter" may form an integral part of a camera or projector specifically for capturing and displaying panoramic 3D stereoscopic images. Manufacture of the mirrors is relatively easy as all such mirrors may be identical and may be circularly symmetric so that, for example, they may easily be made on a turning machine.

BRIEF DESCRIPTION OF DRAWINGS

The present invention will be further described, by way of example, with reference to the accompanying drawings, in which:

FIG. 3($b$) is a cross-sectional view of FIG. 3($a$);

FIG. 10($b$) illustrates variation in stereoscopic baseline for different directions;

FIG. 11($b$) illustrates an alternative arrangement of non-touching mirrors;

FIG. 16($a$) is a diagrammatic side view of an adapter and a camera constituting another embodiment of the invention and FIG. 16($b$) is a diagram illustrating the derivation of an unwrapping equation;

FIG. 17($a$) is a diagrammatic side view of an adapter and a camera constituting a further embodiment of the invention and FIG. 17($b$) is a diagrammatic side view of another adapter and camera constituting yet a further embodiment of the invention;

FIG. 18 is a diagram illustrating an adapter and projector constituting another embodiment of the invention;

FIG. 19($a$) illustrates diagrammatically a technique for encoding left and right views for projection by an arrangement of the type shown in FIG. 18, FIG. 19($b$) illustrates diagrammatically another technique for encoding left and right views for projection by the arrangement, and FIG. 19($c$) illustrates diagrammatically yet another technique for encoding left and right views for projection by the arrangement;

Like reference numerals refer to like parts throughout the drawings.

BEST MODE FOR CARRYING OUT THE INVENTION

Figure 1:
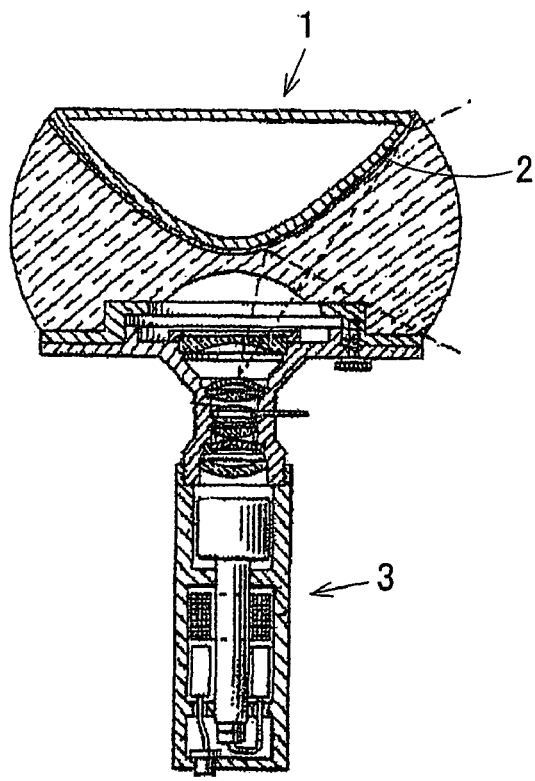
FIG. 1 is a cross-sectional view of a known type of 2D panoramic camera.
Figure 2:
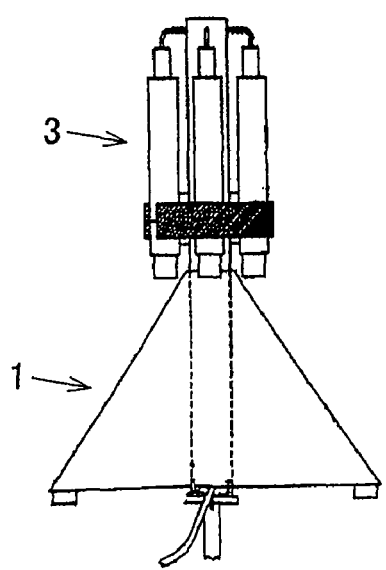
FIG. 2 is a side view of a known type of 3D panoramic camera.
Figure 3:
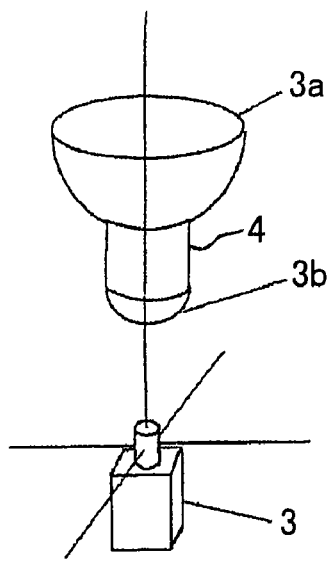
FIG. 3($a$) is a diagrammatic perspective view of a known type of 3D panoramic camera.
Figure 3:
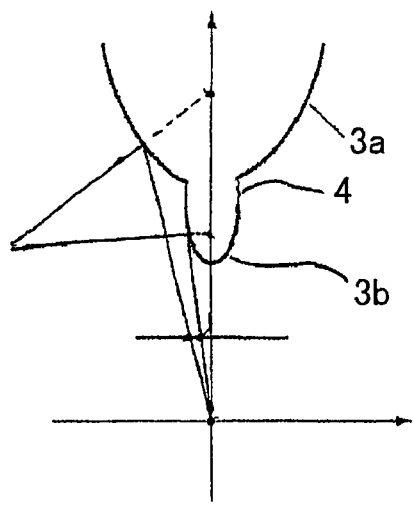
Figure 4:
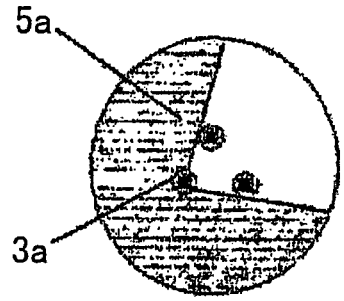
FIGS. 4($a$) to 4($c$) are diagrammatic plan views of a another known type of 3D panoramic camera.
Figure 4:
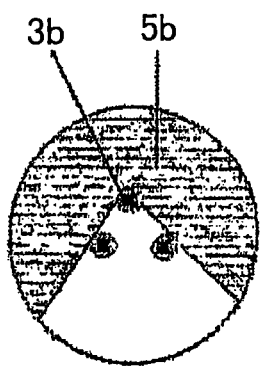
Figure 4:
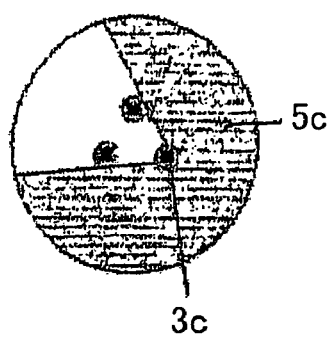
Figure 5:
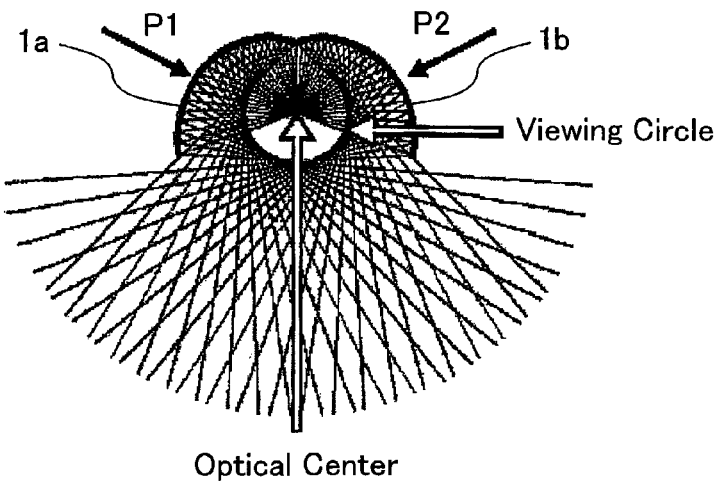
FIG. 5 is a diagrammatic plan view of a further known type of 3D panoramic camera.
Figure 6:
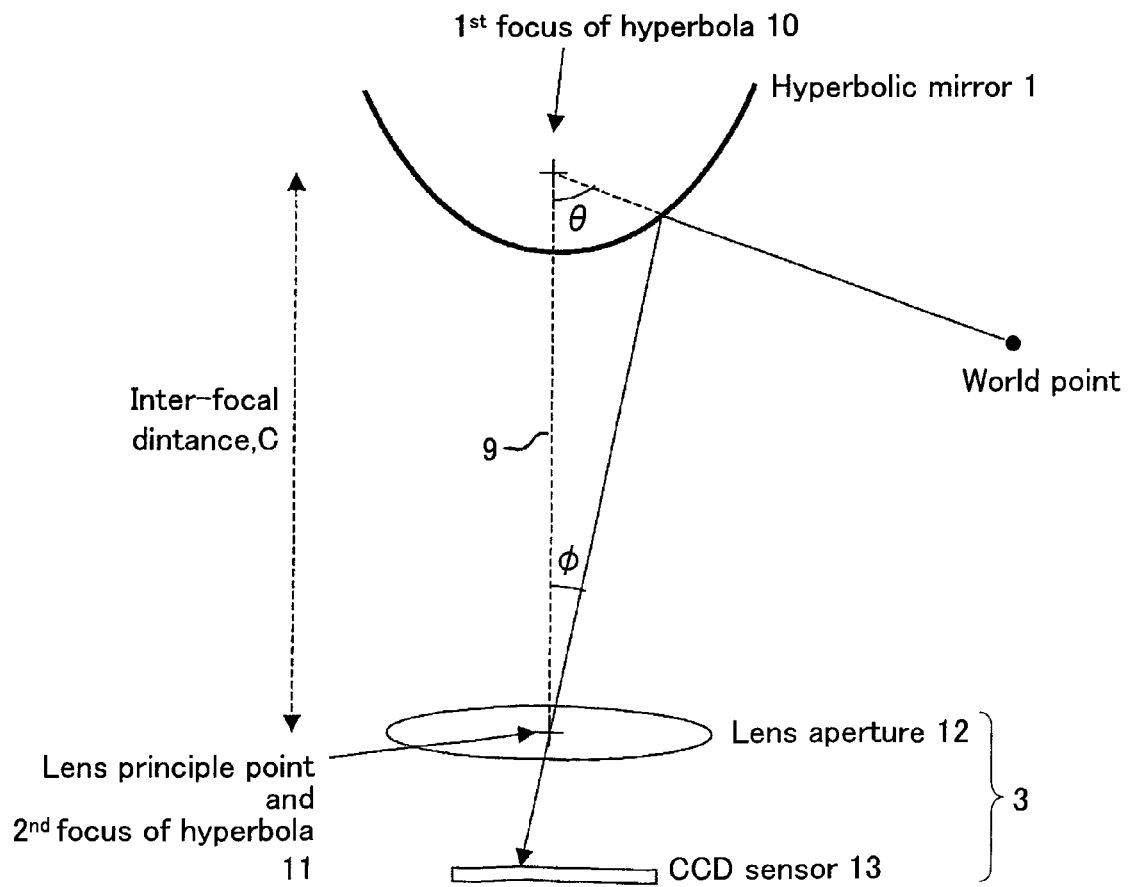
FIG. 6 is a cross-sectional diagram of a known type of 2D panoramic camera with a hyperbolic mirror for illustrating the derivation of an unwrapping equation.

FIG. 6 illustrates the derivation of an unwrapping equation in the case of a simple known type of catadioptric camera system with a convex hyperboloid mirror 1 for a 2D panoramic camera including a conventional or standard camera 3. Such an arrangement is disclosed, for example, in "Panoramic Vision, Sensors, Theory and Applications", Ed. Benosman and Kang, Springer, 2001.

The system comprises a convex hyperbolic mirror 1 which is axisymmetric about an axis 9 and with a first focus of the hyperbola at 10. The mirror 1 is disposed above a camera 3 comprising a lens aperture 12 and a charge-coupled device (CCD) sensor 13. The second focus of the hyperbola is located at the principal point 11 of the lens aperture 12. The camera 3 thus "sees" a reflection from the mirror 1 of a scene extending through 360° around the camera axis, which is coincident with the axis of symmetry 9, and with a vertical field dependent on the design of the mirror 1.

It is necessary that the mirror be a conic section with two foci (one of which is at infinity for a paraboloid) because of the property that a light ray incident on one focus will be reflected through the other focus. In the case of a hyperboloid, the far focus is positioned coincident with the front nodal (principal) point 11 of the lens. Thus, the scene on the camera sensor 13 will appear to have been taken from a single point, i.e. the first focus 10 of the hyperboloid. In this case, there is no stereo baseline in the image and thus a simple geometric transformation can be made independent of the scene to reproduce the geometric aspects properly for all objects at different distances from the camera in the resulting panorama. This is known as the single viewpoint condition.

Any curved non-circular conic section can be used in this system; a convex paraboloid mirror can also be used, but this will require a telecentric lens system (principle points at infinity). Also, concave elliptical mirrors can be used, but they have limited vertical field and may be better for downward projection applications. A circular mirror, however, would not be applicable.

In a coordinate system where the lens principle point and far focus 11 of the hyperboloid are coincident and at the origin and the Z axis defines the symmetry axis of the system, the hyperboloid has the surface equation:

$$\frac{\left(\frac{C}{2} - Z\right)^2}{a^2} - \frac{R^2}{b^2} = 1 \qquad \text{Eq. 1}$$

where C is the distance between the foci, R is the radial coordinate, and a and b are given by:

$$a^2 = \frac{C^2(K-2)}{4K} \qquad \text{Eq. 2}$$

$$b^2 = \frac{C^2}{2K}$$

where K is a modified conic constant defining the shape of the hyperboloid (K>2).

The unwrapping equations can thus be written simply such that the distance of a point from the axis on the CCD sensor is proportional to tan(ϕ) and is related to the vertical angle of the real world object, θ, by:

$$\tan(\phi) = \frac{K - 1 - \sec(\theta)\sqrt{K(K-2)}}{\cot(\theta) - K(K-2)\tan(\theta)} \qquad \text{Eq. 3}$$

From this equation, a proper 2D panorama can be constructed.

Figure 7:
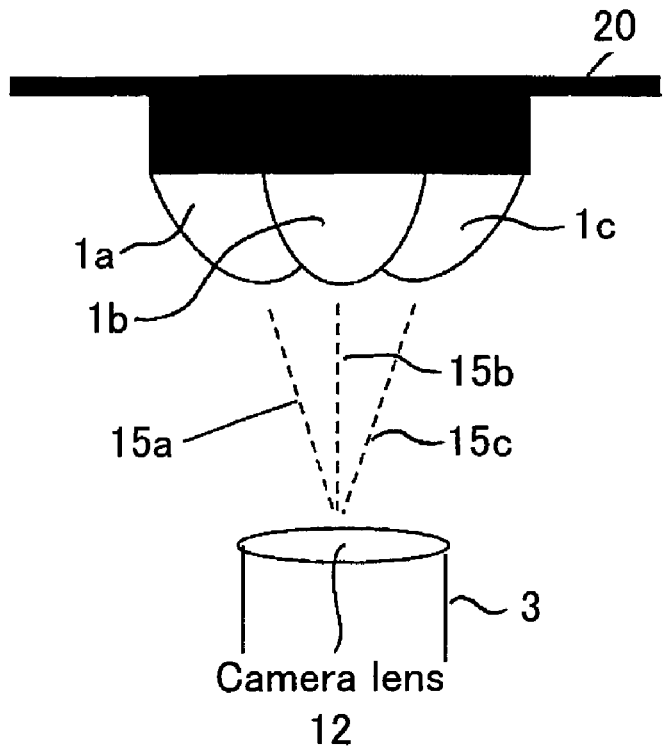
FIG. 7($a$) is a diagrammatic side view of an adapter and camera constituting an embodiment of the invention and FIG. 7($b$) is a diagrammatic view looking down on mirrors of the adapter.
Figure 7:
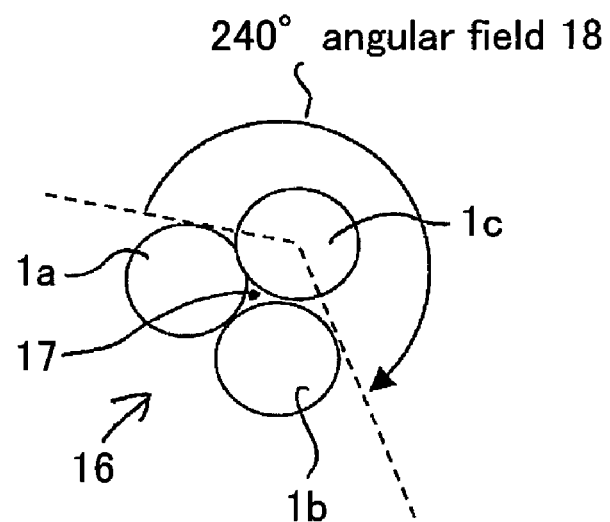

FIGS. 7(a) and 7(b) illustrate an arrangement for capturing a 3D panoramic set of images permitting full 360° stereoscopic image capture using a single camera 3. This arrangement may comprise a dedicated 3D panoramic camera or may comprise an adapter for adapting a conventional camera to capture 3D panoramic images. The arrangement is shown with a set of three hyperbolic mirrors 1a, 1b, 1c disposed vertically above the camera 3 but other orientations may be used as desired. For example, the camera 3 may be disposed above the mirrors 1a, 1b, 1c or the arrangement may be disposed with the camera optical axis oriented horizontally.

Each of the mirrors 1a, 1b, 1c is axisymmetric about an axis of symmetry 15a, 15b, 15c and the axes are non-coaxial. The axes of hyperbola converge on the lens 12 of the camera 3.

The mirrors 1a, 1b, 1c are of identical shapes and sizes and are disposed so as to touch each other as illustrated at 16 so that the mirrors are effectively arranged at the apices of an equilateral triangle. The first foci are disposed equiangularly around and equidistantly from a longitudinal axis 17 of the adapter. The axis 17 is coincident or coaxial with the optical axis of the lens 12 of the camera 3. The axes of symmetry 15a, 15b, 15c converge towards the camera lens 12 and intersect the longitudinal axis 17 of the adapter at the front principal point of the camera lens 12. The first foci of the hyperbolic mirrors 1a, 1b, 1c are disposed in a plane which is perpendicular to the longitudinal axis 17.

The camera 3 may be of any type, for example for capturing single or still images or sequences of moving or video images. Although FIG. 6 illustrates the use of a CCD sensor 13, any appropriate light-sensitive device may be used for capturing the or each image. For example, conventional photo-sensitive emulsion film may be used or other types of sensors may be used. For example, the camera 3 may be a digital camera or a camcorder and may be of conventional type, so that the adapter comprising the mirrors 1a, 1b, 1c is used to allow the capture of stereoscopic 3D panoramic image data in a "single shot" for each image or for each image of a sequence for capturing moving images. Thus, the camera 3 has a single lens (or other optical system) and a single light-sensitive plane and all the image data for each 3D panorama are captured simultaneously by such a camera system.

Each of the mirrors 1a, 1b, 1c maintains the single viewpoint condition separately so that the three images captured by the camera sensor are from three distinct and different viewpoints. Each mirror has a 240° angular field 18 which does not include views of the other mirrors. The three segments can therefore be cut and pasted into two (2×360°=3×240°) homologous 3D 360° images because of the separate viewpoints with a baseline which is determined by the mirror foci separation. This results in a 3D image of simultaneous views with horizontal parallax only.

Because each mirror 1a, 1b, 1c is tilted at a different angle to the camera 3, each mirror view has to be treated separately. The use of spherical trigonometry to transfer between different axi-symmetric coordinate systems is thus necessary. The conversion mathematics is still global and the same for all scenes and does not rely on any unreliable feature matching.

Figure 8:
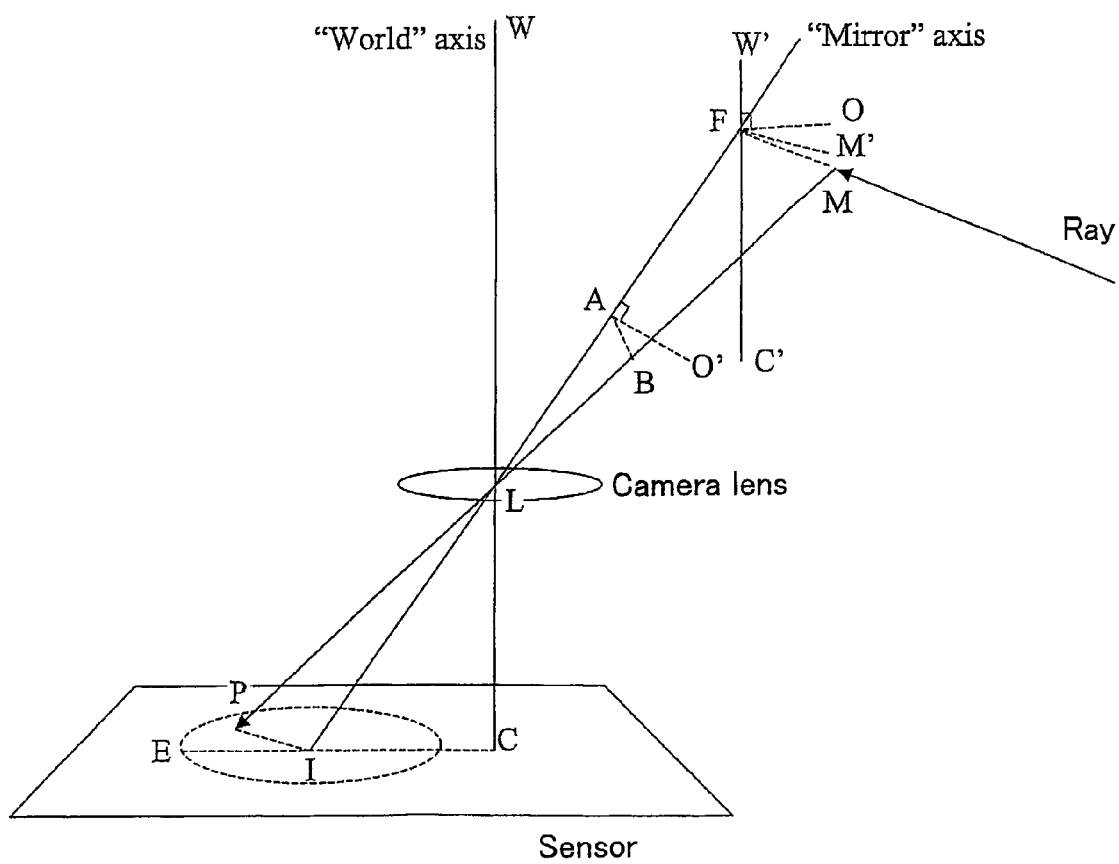
FIG. 8 is a diagram illustrating the derivation of an unwrapping equation for the camera shown in FIGS. 7($a$) and 7($b$)

The geometry of the conversion mathematics is shown in FIG. 8. The definitions of the lines are as follows:

Line WC defines the axis about which the final image will be produced. It is also the perpendicular to the sensor.

Line W'C' is parallel with WC passing through the first mirror focus

M is the point of intersection of an arbitrary ray from an object with the mirror whose extension passes through the first mirror focus F is the focus of the mirror hyperbola O is an arbitrary direction defining the zero azimuthal angle.

P is the ray intersection point with the sensor

I is the centre of the mirror image on the sensor

E is the top edge of the mirror image.

A and B are arbitrary points on FI and MP, respectively, so that AB is perpendicular to FI Line MP defines the ray direction to the sensor Line FI defines the mirror axis of symmetry and the centre of the image circle.

L is the lens principle-point and lies on lines WC, FI and MP.

O' is a semi-arbitrary point defined within the same plane as A, F and O.

AB and O'A are both perpendicular to line FI

The direction M' is defined so that M' F is perpendicular to W'C' and in the same plane as W', C' and M MF and FO are both perpendicular to W'C' and the definitions of the symbols are as follows:

Angles WLF, LFC' and ILC are the inclination angle, δ.

Angle OFM is $\theta_A'$
Angle LFM is $\theta$.
Angle C'FM is the world angle $\theta'$.
Angle BAO' is $\phi_A$
Angles MLF and ILP are $\phi$
Angle CLP is $\chi$
Distance IP is the length H
Distance IE is the length $H_M$
Angle CIP is $\chi_A$
If M is at the edge of the mirror and in the same plane as O, then P is the same as E and the angle MLF is the maximum angle $\phi_0$ Once the picture is taken of the scene, it is necessary to convert the pixel position of a particular object in the image into an image that conforms to the real-world coordinates. In other words, we wish to relate the image coordinate of a point in one of the circles of the taken image, defined by a radius H and an azimuthal angle $\chi_A$, to the real world defined by a spherical vertical angle $\theta'$ and azimuthal angle $\theta_A'$.

This is done by defining the output image in terms of the real world coordinate ($\theta'$, $\theta_A'$) and, working backwards to calculate the pixel in the image circle, this corresponds to (R, $\chi_A$) in pixel coordinates.

The relationships are given by equation group 4, along with equation 3:

$$\cos(\theta) = \cos(\theta')\cos(\delta) - \sin(\theta')\sin(\delta)\cos(\theta_A')$$

$$\cos(\phi_A) = \frac{\cos(\theta') - \cos(\theta)\cos(\delta)}{\sin(\theta)\sin(\delta)}$$

$$\cos(\chi) = \cos(\phi)\cos(\delta) - \sin(\phi)\sin(\delta)\cos(\phi_A)$$

$$H = \sqrt{1 + (\cos(\delta)\sec(\chi))^2 - 2\cos(\delta)\sec(\chi)\cos(\phi)}$$

$$H_M = \cos(\delta)\tan(\delta + \phi_0) - \sin(\delta)$$

$$R = R_0 \frac{H}{H_M}$$

$$\cos(\chi_A) = \frac{H^2 + \sin^2(\delta) - \cos^2(\delta)\tan^2(\chi)}{2H\sin(\delta)}$$

Eq. 4 where $R_0$ is the radius of the image circle in pixels. This is done for each of the three image circles over the 240° segment of each circle. This produces three 240° images.

Figure 9:
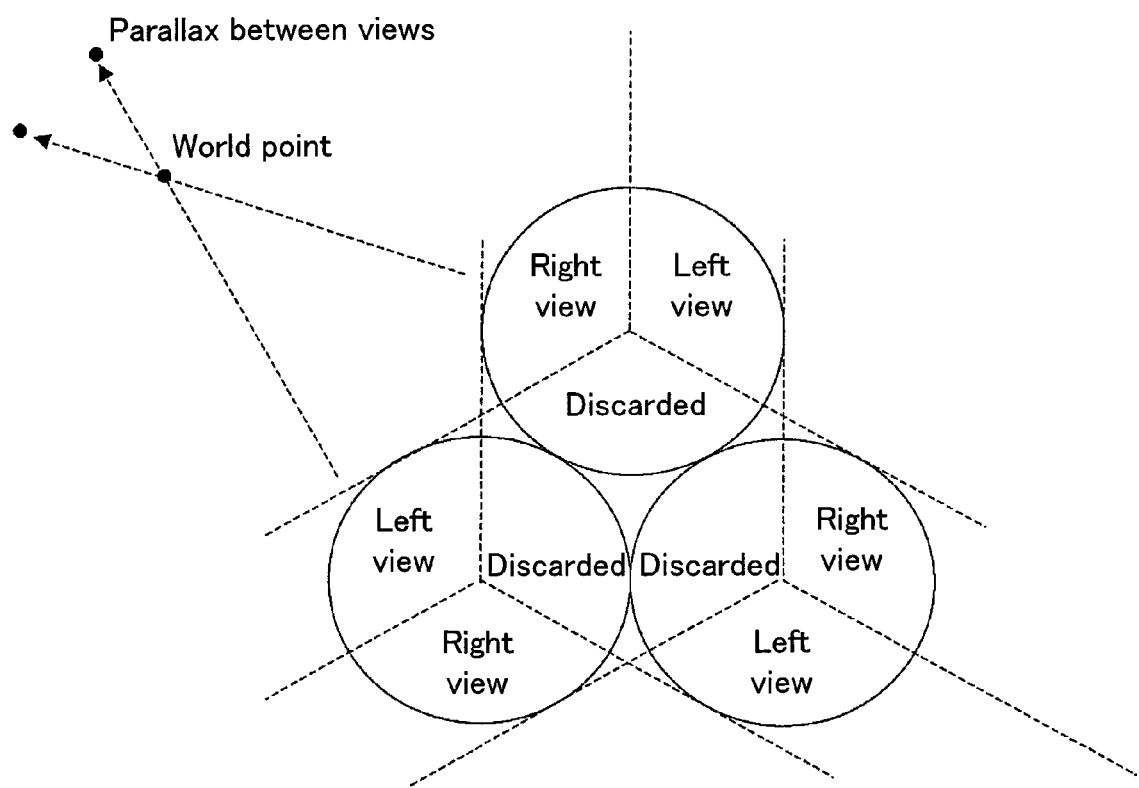
FIG. 9 is a diagram illustrating the relative locations of right and left image views on a sensor of the camera shown in FIGS. 7($a$) and 7($b$)

In order to create a 3D image, each of the three unwrapped 240° segments is "cut" in half vertically as illustrated in FIG. 9. The resulting three 120° left hand views are then assembled so as to create one 360° homologous view. Similarly, the three 120° right hand views are assembled, resulting in a full 360° panoramic stereoscopic image. Three "Left View" segments can be stitched to make a 360° left view. Three "Right View" segments can be stitched to make a 360° right view.

In the embodiment shown in FIGS. 7(a) and 7(b), it is typically possible to achieve an angular field of view in a vertical plane on one side of the longitudinal axis of up to 135°. With the orientation illustrated in FIG. 7(a), this can be arranged to extend from substantially directly downwardly to 45° above the horizontal plane.

A darkened or substantially non-reflective shield 20 is disposed behind the mirrors 1a, 1b, 1c so as to prevent background light from entering the camera lens 3. Such a shield prevents any light sources behind the mirrors from causing inappropriate exposure settings in cameras equipped with automatic exposure systems. For example, with the camera oriented as illustrated in FIG. 7(a), the shield 20 prevents building lighting, which is typically disposed on ceilings or high up on walls, from undesirably affecting camera exposure settings.

Figure 10:
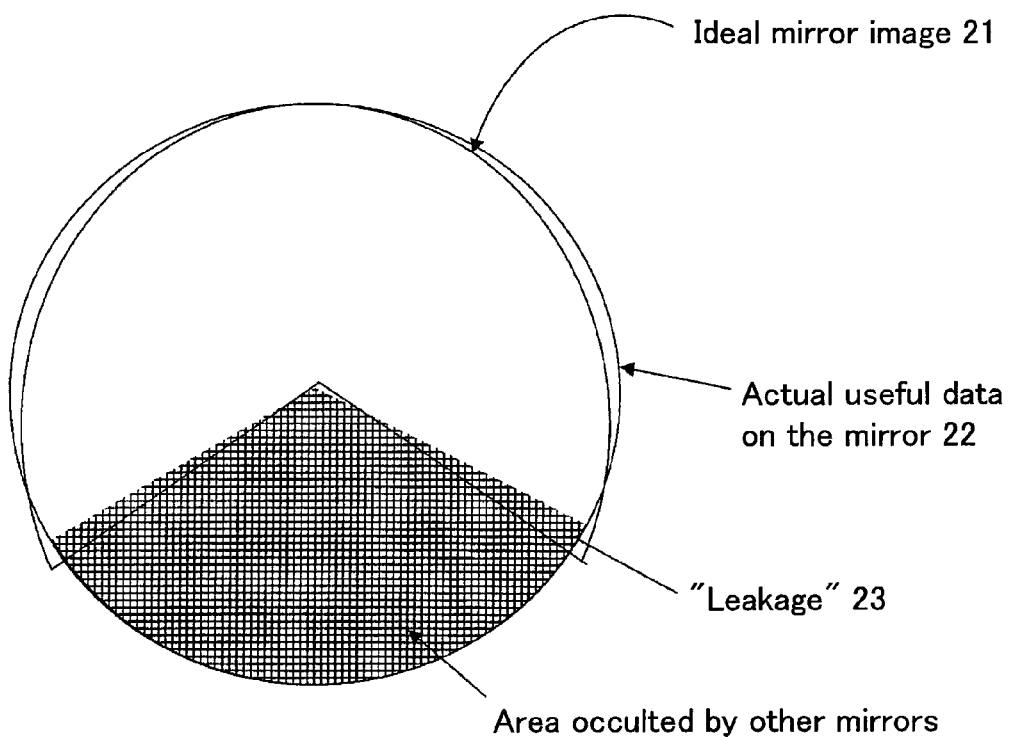
FIG. 10($a$) is a diagram illustrating areas of useful data and leakage on a camera sensor for one of the mirrors.
Figure 10:
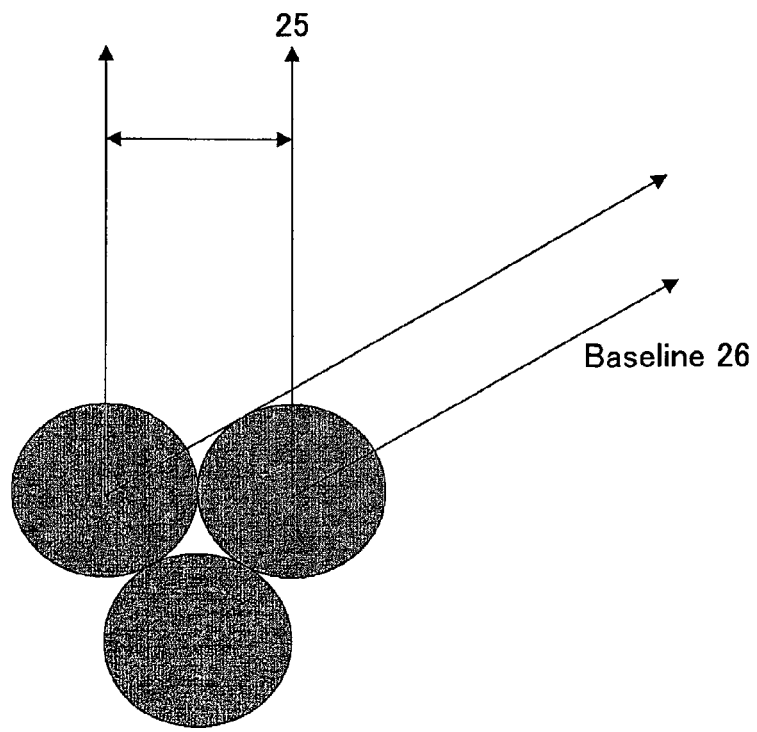

As illustrated in FIG. 10(a), the mathematical mapping from a circular image on the camera sensor to a real world panorama does not match precisely. The ideal mirror image for unwrapping to a rectangular image is illustrated at 21 whereas the useful data on the mirror is illustrated at 22 and this occurs because of the tilting of the axes of symmetry 15a, 15b, 15c relative to the longitudinal axis 17. This is referred to as "artefact leakage" 23 and results in "dark" areas in the corners of each image segment.

As illustrated in FIG. 10(b) the projected stereoscopic baseline varies in length for different azimuth angles. At one extreme as illustrated at 25, the baseline is twice the mirror radius whereas, in the direction illustrated at 26, the baseline is reduced to a minimum of one radius. There is therefore a baseline variation of 50% of the maximum baseline length.

For some applications, these effects are unimportant and do not give rise to unacceptable visual artefacts. However, reducing these effects provides an actual improvement in final image quality and either or both of these effects may be reduced as follows.

Figure 11:
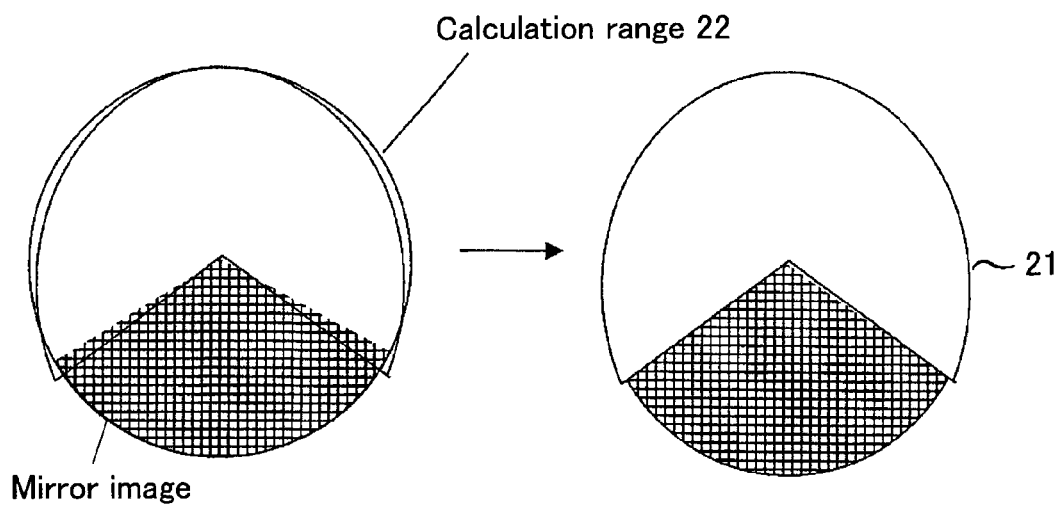
FIG. 11($a$) is a diagram illustrating a technique for correcting at least partially for the effect illustrated in FIG. 10($a$)
Figure 11:
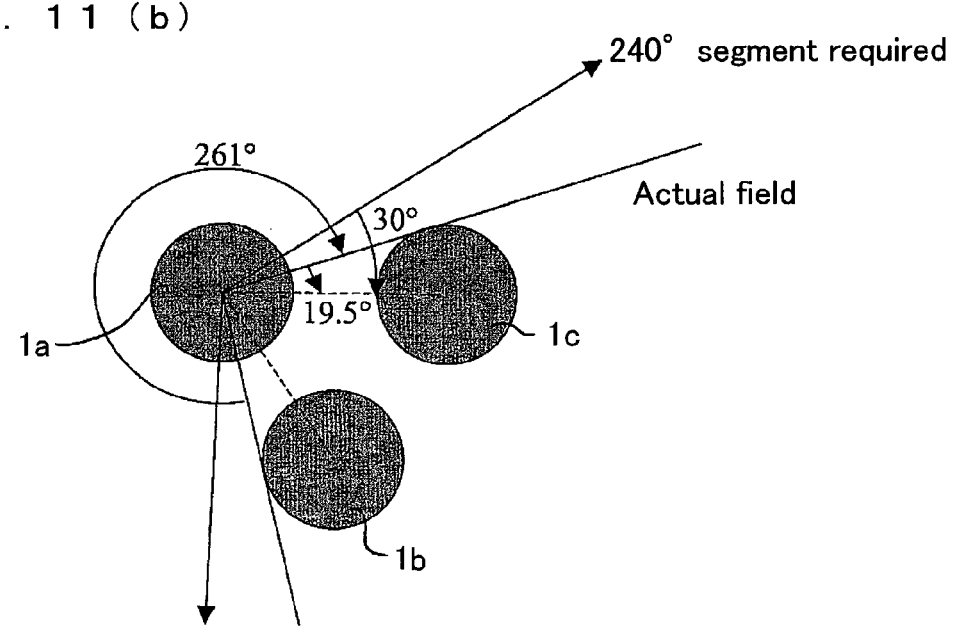

Reduction or elimination of the artefact leakage illustrated in FIG. 10(a) may be achieved by restricting the real world angle range and/or by changing the cross-sectional view of the mirrors so that the image of the mirrors on the sensor matches the mapping from a rectangular real world angular range. The latter technique (original mirror view) is illustrated in FIG. 11(a), in which the arrangement at the left hand side of FIG. 11(a) described hereinbefore is changed as illustrated in the right hand side of FIG. 11(a). In particular, the reflective surface of each mirror such as 1a is modified so that the mirror effectively ends at an edge 30 defined by a plane which intersects the axis of symmetry of the mirror 1a non-perpendicularly. Thus, a point 31 extends further from the mirror apex 32 in the direction of the axis of symmetry than, for example, a point 33 or 34. The resulting useful data match much more closely the ideal data distribution as illustrated at 2 in FIG. 11(a). The edge 30 of the mirror may be further modified to reduce the artefact leakage.

FIG. 11(b) illustrates the effect of separating the mirrors (new designed mirrors) 1a, 1b, 1c such that they are non-touching. This results in an increased field of view. In the example illustrated where the adjacent pairs of mirrors are separated by a distance substantially equal to the mirror radius at the base thereof, the actual field of view from each camera is 261°, whereas only 240° is actually required. Such an arrangement may thus be used to reduce artefact leakage.

Figure 12:
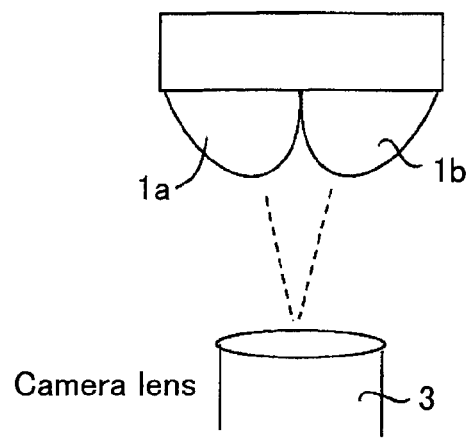
FIG. 12($a$) shows a view similar to FIG. 7($a$) of another adapter and camera constituting another embodiment of the invention and FIG. 12($b$) is a diagrammatic view looking down on mirrors of the adapter of FIG. 12($a$)
Figure 12:
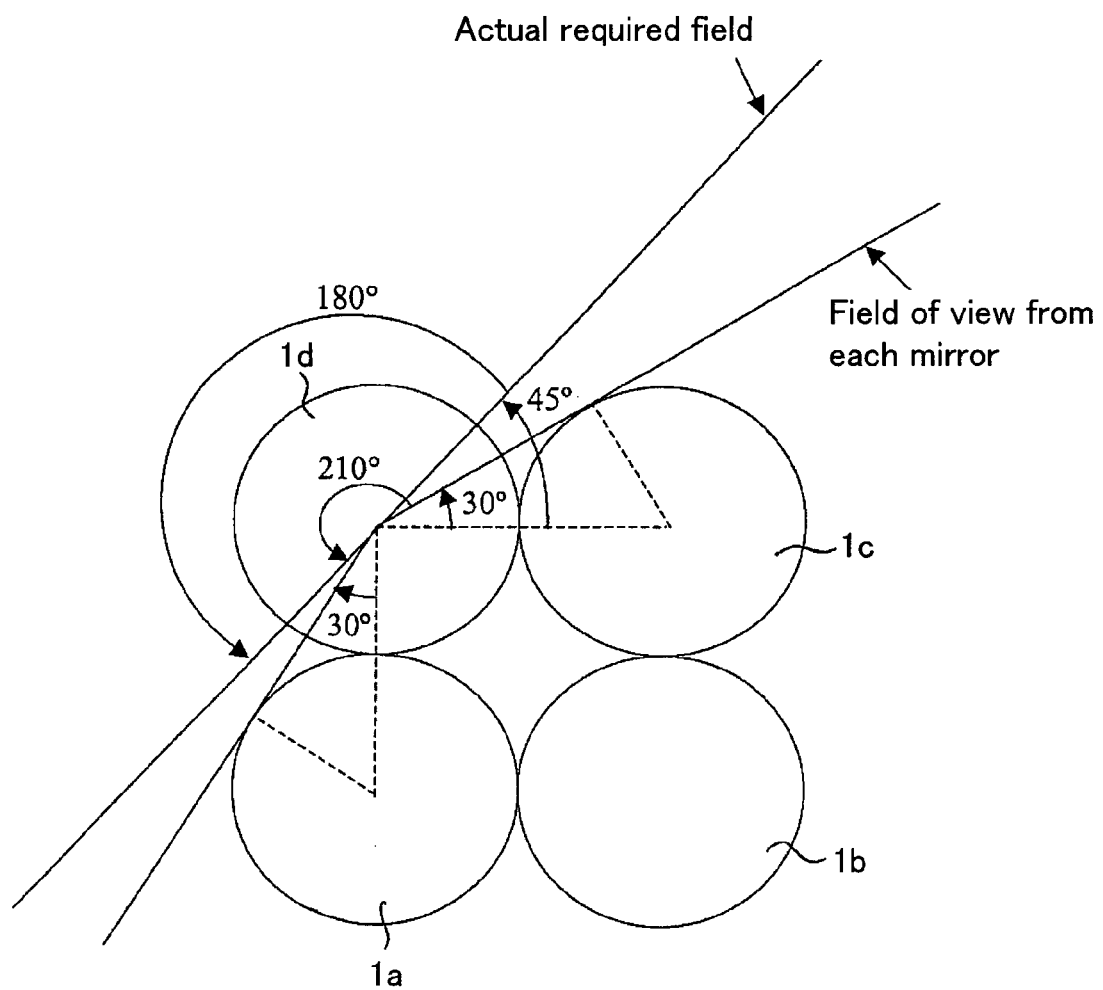

FIGS. 12(a) and 12(b) illustrate an adapter and camera comprising four mirrors 1a-1d arranged in a square. In this arrangement, although each mirror provides a 210° field of view, only 180° is needed so that any leakage overlap above 180° does not produce any artefact. Also, the edge of each required angular field is at 45° to the line between the centres as opposed to 30° in the three mirror arrangement illustrated in FIG. 11(b). The stereo baseline in the centre is twice the mirror radius. The stereo baseline at edge of the field is $\sqrt{2}$ times the mirror radius. Thus, the variation in stereo baseline is reduced from 50% of the maximum value to 29%. Reductions in both artefact leakage and baseline variation are therefore achieved.

Figure 13:
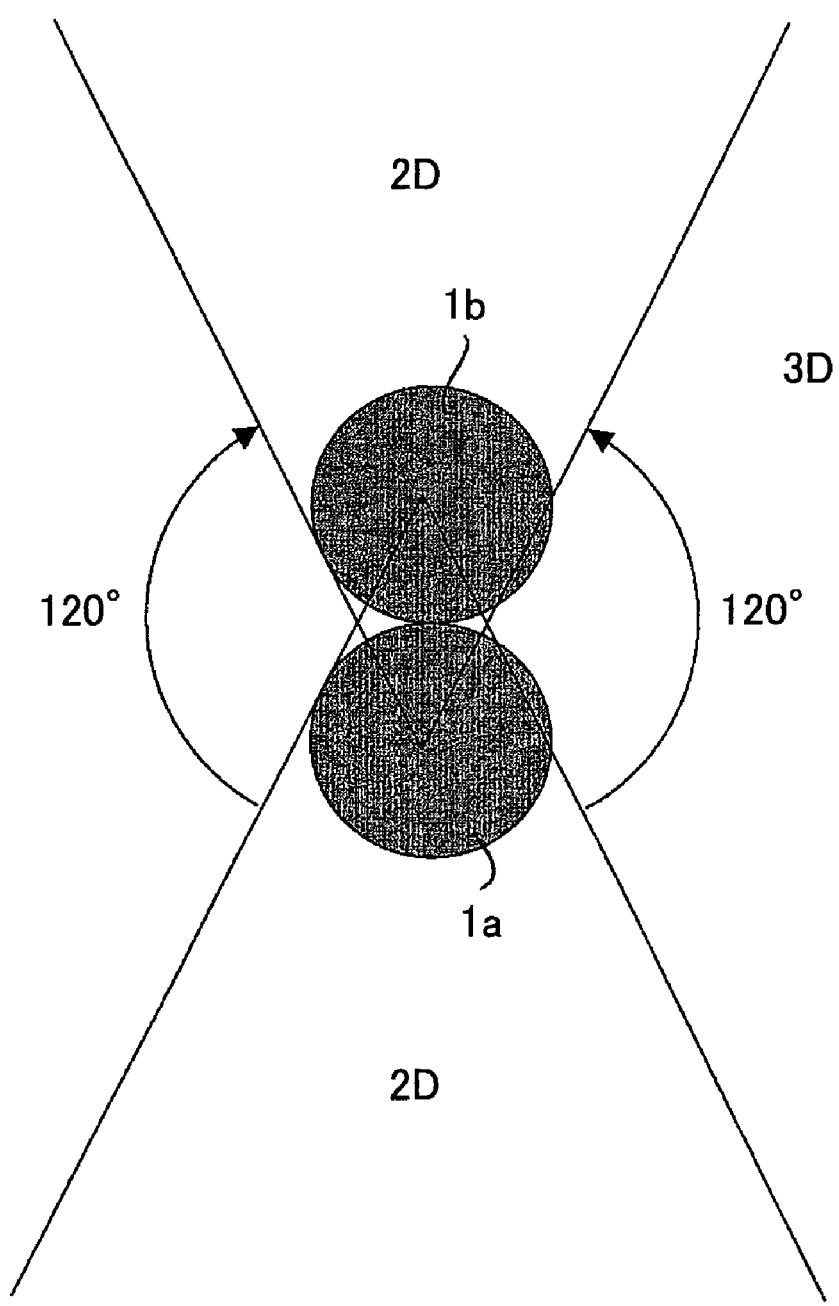
FIG. 13 is a diagram illustrating a mirror arrangement of an adapter constituting a further embodiment of the invention.

Although more than four mirrors may be used, increasing the number of mirrors for a given camera spatial resolution reduces the spatial resolution of each image.

Where three or more mirrors are used, it is possible to capture a full 360° panoramic stereoscopic image. However, if a more restricted angular range in the horizontal plane is sufficient, then two mirrors may be used and this is illustrated in FIG. 13. Such an arrangement provides full stereoscopic images over 120° ranges forwards and backwards.

3D image data can be constructed over this range. In 60° angular ranges to the sides, 2D image data can be captured so that 2D image data are visible over a full 360° angular range in the horizontal plane. In those applications where the restricted 3D image data are acceptable, it is possible to provide a cheaper camera. For example, in security applications, providing image coverage from a wall corner or along a corridor using the front and rear 3D angular ranges will only require a panoramic view which could be provided by two mirrors.

FIGS. 14(a) to 14(d) illustrate arrangements for mounting the mirrors 1a, 1b, 1c on the camera lens 3. Each of these arrangements makes use of a mounting 40, which may be of any suitable type for attaching the adapter in the correct position and orientation on the lens of the camera 3.

Figure 14:
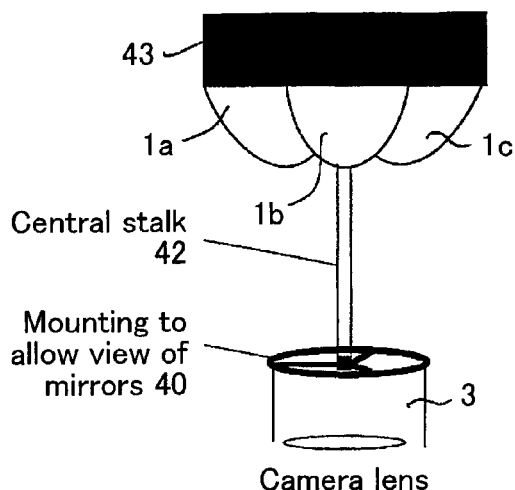
FIGS. 14($a$) to 14($c$) are diagrammatic side views of mounting arrangements for mounting an adapter to a camera and FIG. 14($d$) is a diagrammatic view looking down on the mounting arrangement of FIG. 14($a$).
Figure 14:
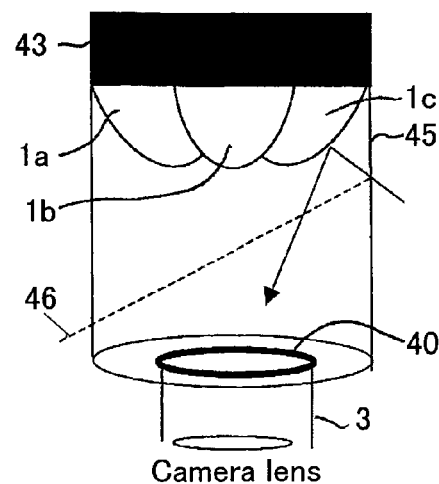
Figure 14:
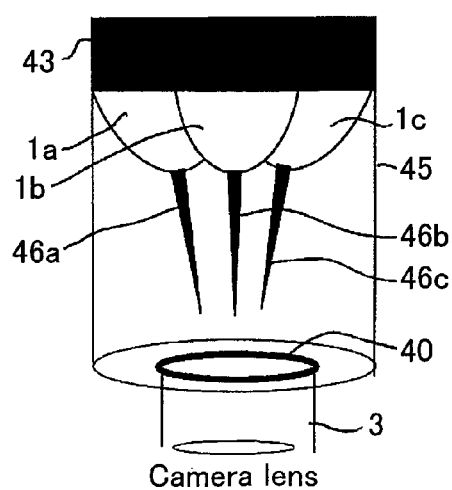
Figure 14:
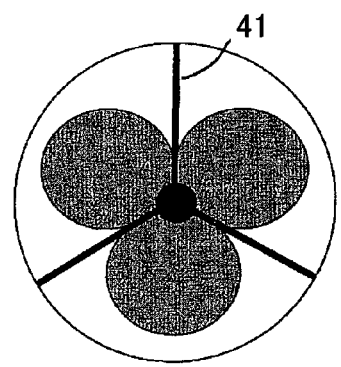

In the arrangement illustrated in FIG. 14(a), the mounting 40 is fixed to or integral with spokes such as 41 (FIG. 14(d)), which radiate from and are fixed to or integral with one end of a central stork or rod 42. The rod 42 extends along the longitudinal axis of the adapter and through the middle of the mirrors 1a, 1b, 1c so that its other end is attached to or integral with the mirror mounting arrangement 43.

In general, the number of spokes 41 is equal to the number of mirrors, 1a, 1b, 1c and a plane containing the first focus of a respective mirror and the longitudinal axis bisects the angle between adjacent spokes.

FIG. 14(b) illustrates an alternative mounting arrangement in which the mounting 40 is fixed to the mirror mounting 43 by means of a substantially transparent cylinder 45. Such an arrangement provides protection for the surfaces of the mirrors. However, internal reflections from the cylinder 45 may create ghosting in the captured images as illustrated by the incident ray path 46 and as disclosed in H Ishiguro, "Development of low-costs compact omnidirectional vision sensors", complied in "Panoramic Vision", Springer Verlag, 2001, ISBN 0387951113. Such ghosting can be reduced or eliminated by the use of black or non-reflective spikes 46a, 46b, 46c as illustrated in FIG. 14(c). These spikes extend along the axes of symmetry of the mirrors and are convergent towards the principal point of the lens 3 but are not required to extend as far as the principal point.

Figure 15:
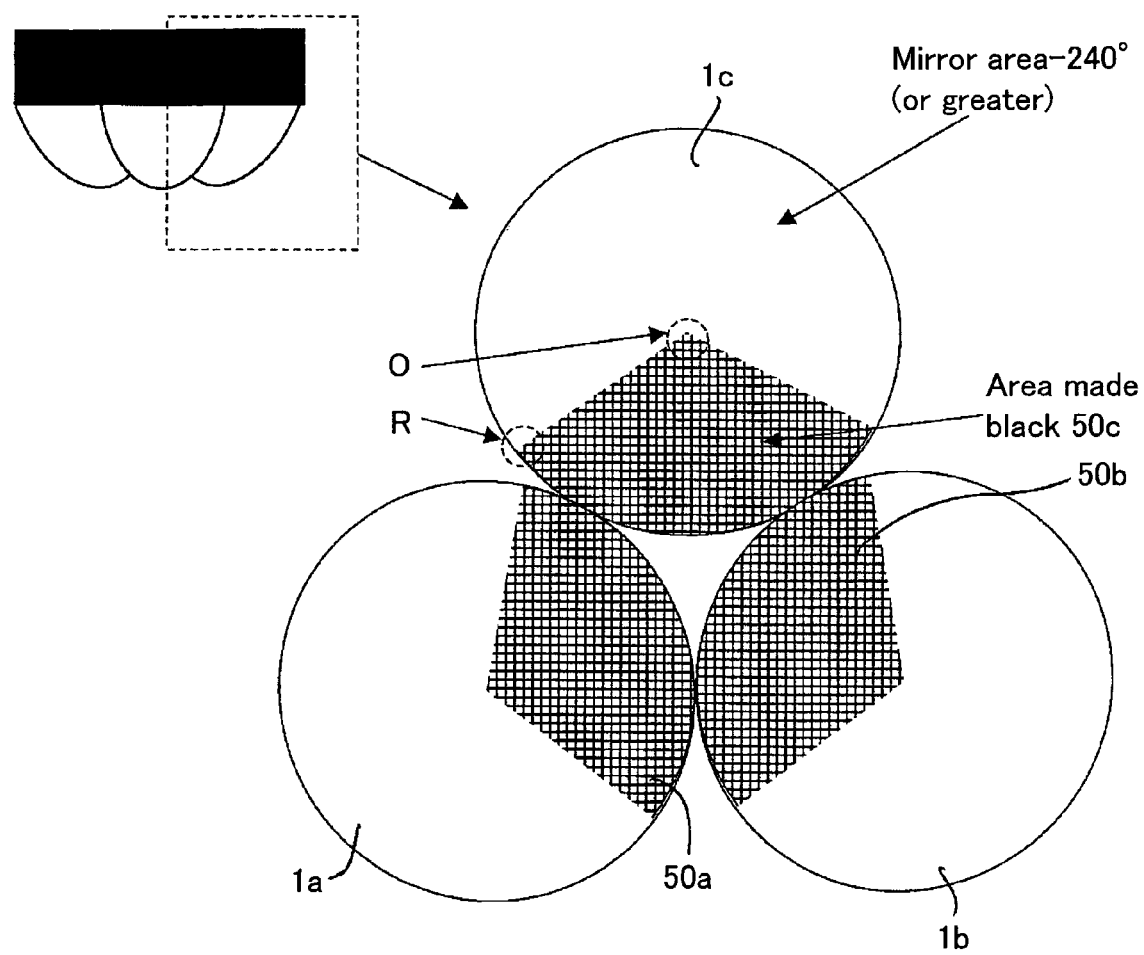
FIG. 15 is a diagram illustrating a modification of the mirrors shown in FIGS. 7($a$) and 7($b$)

In order to reduce the effects of undesirable reflections, the parts of the mirrors which are not effectively used to form the images may be made non-reflective, for example by being painted matt black. For example, FIG. 15 illustrates such blackening of the appropriate areas 50a, 50b, 50c for the three mirror embodiment illustrated in FIGS. 7(a) and 7(b). In this case, the 120° segments of the mirrors facing the longitudinal axis of the adapter are made substantially non-reflective. This also allows processing software for processing the captured images to determine more easily the centres and radii of the "circular" images formed on the sensor by finding a point O and a point R and thus facilitate image processing.

FIGS. 16(a) and 16(b) illustrate an adapter and camera which differ from those shown in FIGS. 7(a) and 7(b) in that the reflectors 1a, 1b, 1c are concave ellipsoidal reflecting surfaces. Axes 15a to 15c of ellipsoid converge on the lens 12 of the camera 3.

The formulae in this case would then be:

$$\frac{\left(\frac{C}{2} - Z\right)^2}{u^2} + \frac{R^2}{v^2} = 1$$

$$u^2 = \frac{C^2(2K' + 1)}{4}$$

$$v^2 = \frac{C^2 K'}{2}$$

$$\tan(\phi) = \frac{K'}{(K' + 1)\cot(\theta) + cosec(\theta)\sqrt{(2K' + 1)}}$$

where K' is a different modified conic constant defining the ellipse shape (K'>0). Equation group 4 still defines the relationship between the tilt angles here.

In a further embodiment as illustrated in FIGS. 17(a) and 17(b), convex paraboloidal mirrors may be used. Such mirrors have a first focus, but their second focus is at infinity.

In this case, the axes of symmetry of the mirrors are parallel to each other (but non-coaxial) and to the longitudinal axis 17 of the adapter. This requires the use of a telecentric lens system for the camera 3, which may be a large telecentric lens as illustrated at 12a in FIG. 17(a) or a custom telecentric triplet lens as illustrated at 12b in FIG. 17(b) in order to incorporate the three parboloid mirrors.

The adapter described hereinbefore may also be used with projectors to provide 3D panoramic projection systems and an example of such a system is illustrated in FIG. 18. The system comprises a projector 55 of conventional type arranged to project appropriately modified images. For example, the projector may be mounted in or under the floor of a room pointing vertically upwards. An example of a suitable known type of projector is one which employs a digital micromirror device (DMD) with a colour wheel.

The projector includes a projection lens 56 which directs light upwards and onto a set of conic section mirrors 57, for example disposed on the ceiling of the room. The mirrors 57 reflect light onto a 360° screen or wall 58 for viewing by viewers in the room. Such a system may be used to provide stereoscopic panoramic images on the screen or wall 58 to be viewed by viewers wearing viewing aids such as spectacles of the appropriate type. In order for the correct images to be viewed, the images supplied to the DMD or other spacial light modulator or the like in the projector 55 are in a format similar to those recorded by the cameras and adapters described hereinbefore.

In order for the projected images to be viewed stereoscopically, the left and right images are encoded so that the viewing aids worn by the viewers can correctly decode the images and ensure that the left and right eye images are visible only to the left and right eyes, respectively, of each viewer. For example, as illustrated in FIG. 19(a), the left and right images may comprise red and cyan colour components only for anaglyph projection. The viewing aids then comprise spectacles with colour filters for passing only red light to the left eyes and only cyan light to the right eyes of the observers.

Left and right view encoding may alternatively be performed by polarisation encoding so that the left and right images have orthogonal polarisations and the viewing aids comprise polarisation analysers. The projection screen 58 is required to be of the polarisation-preserving type. FIG. 19(b) illustrates an arrangement for achieving this and comprises a polariser 60 (or colour sensitive polarizer) if necessary and a patterned retarder 61 associated with the projection lens 56.

The patterned retarder 61 is arranged to pass all of the parts of one image with its polarisation unchanged and to convert the polarisation of the parts of the other image to the orthogonal polarisation.

Time-sequential encoding may be used for encoding the left and right views together with suitably synchronised shutter glasses, for example embodied in liquid crystal technology. A system which combines this with polarisation encoding is illustrated in FIG. 19(c). The left and right images are projected time-sequentially and a switchable retarder 65 is switched in synchronism to encode the left and right views with orthogonal polarisations.

Figure 20:
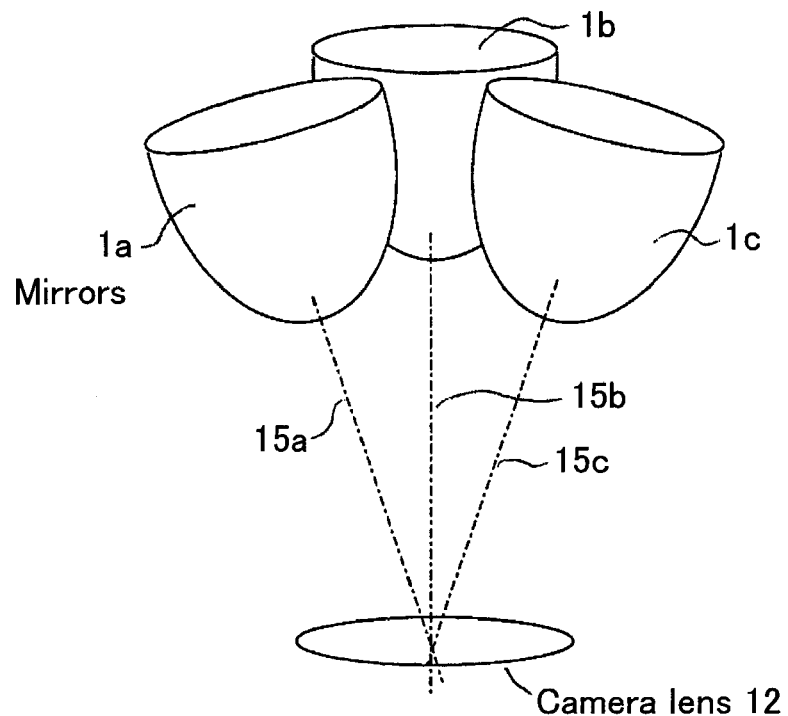
FIG. 20 illustrates a possible construction of mirrors in an adapter constituting another embodiment of the invention.

FIG. 20 illustrates diagrammatically a first way of embodying the mirrors. In this arrangement, the mirrors 1a, 1b and 1c are manufactured or formed separately from each other and are then fixed to a suitable mounting (not shown), which orients the mirrors such that the axes of symmetry 15a, 15b and 15c converge to a common point, which is coincident with the principal point of the camera lens 12.

Figure 21:
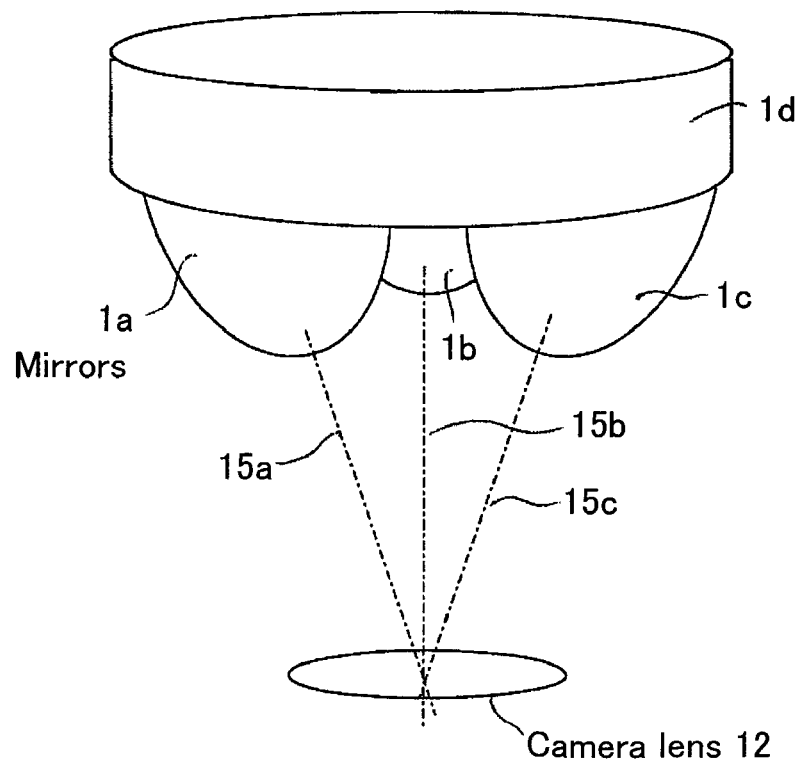
FIG. 21 illustrates another possible construction of mirrors in an adapter constituting a further embodiment of the invention.

FIG. 21 illustrates an alternative construction for the mirrors. In this arrangement, the mirrors 1a, 1b and 1c are cut out of a single block of material such that the mirrors are integral with a mounting 1d. Again, the mirrors are formed such that there axes of symmetry intersect each other at the principal point of the camera lens 12 when the adapter is mounted on a camera.

Figure 22:
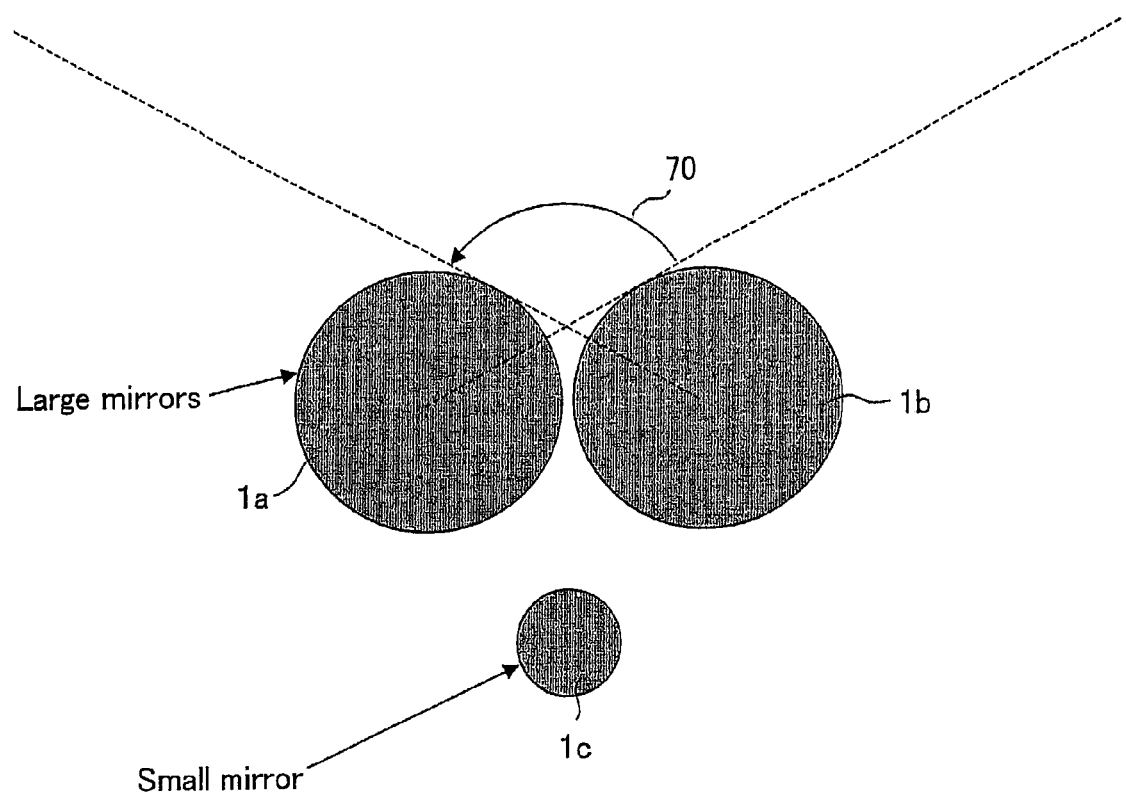
FIG. 22 is a diagram illustrating a mirror arrangement of an adapter constituting yet another embodiment of the invention.

In the embodiments described hereinbefore, the mirrors of each embodiment are of the same shape and size. However, in the case of adapters having three or more mirrors, this is not essential. For example, FIG. 22 illustrates an embodiment in which the mirrors 1a and 1b are relatively large and of the same shape and size, whereas the mirror 1c is relatively small but is of the same shape as the large mirrors 1a, 1b. Such an arrangement may be used to provide improved image resolution in one or more ranges of directions at the expense of reduced image resolution in one or more other ranges of directions. In the embodiment illustrated in FIG. 22 with the two large mirrors 1a and 1b and the one small mirror 1c, higher image spatial resolution is obtained in an angular range 70 of viewing directions, as compared with an adapter of essentially the same size comprising three mirrors of the same size. Outside the angular viewing range 70, lower resolution is obtained than would be provided by three mirrors of the same size. Such an arrangement may be used, for example, for monitoring a preferred direction or angular range of directions while permitting monitoring of other directions to be done.

Figure 23:
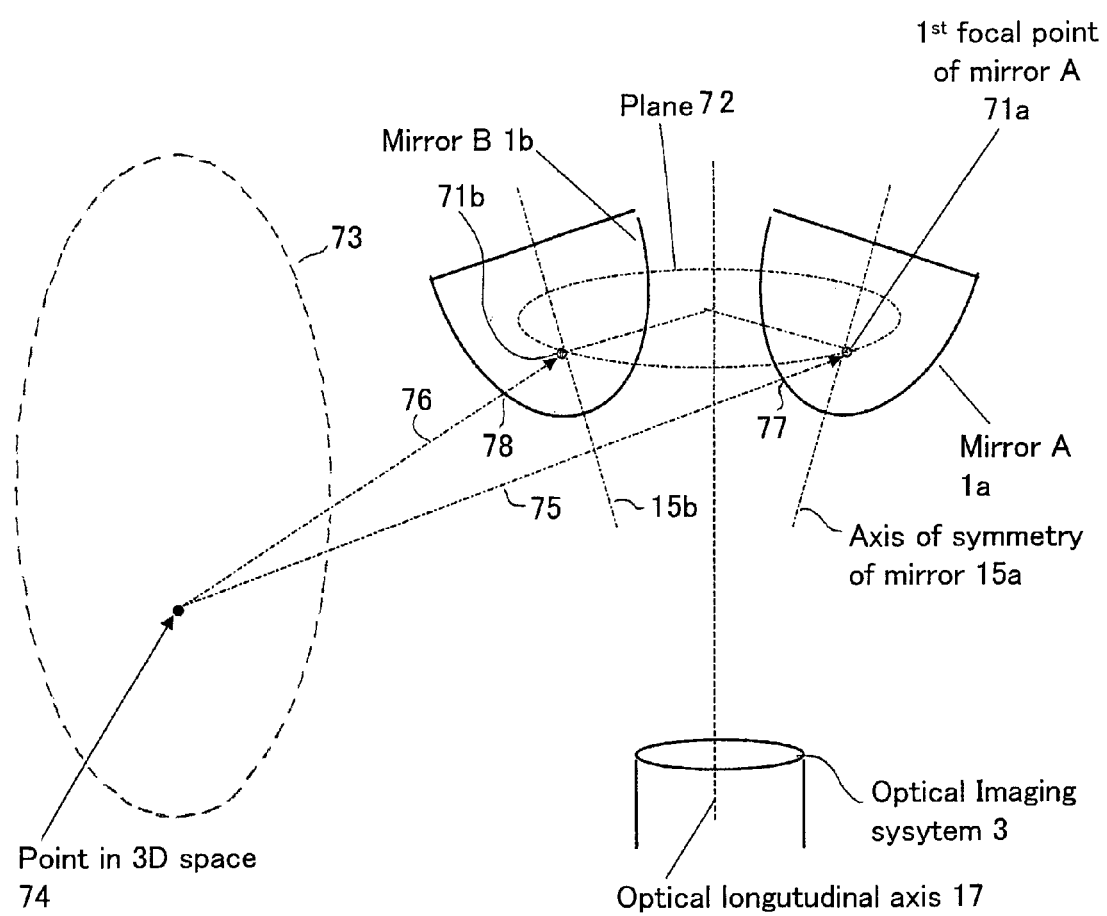
FIG. 23 is a diagram illustrating the meaning of a possible definition of the invention.

In order to be capable of performing as a panoramic three-dimensional adapter, such an adapter must meet various requirements in terms of its construction. Such requirements may be defined in different ways but FIG. 23 illustrates one such definition. The adapter has a longitudinal axis 17 which is coaxial with an optical longitudinal axis of the instrument when the adapter is used with the instrument. In the example illustrated, the instrument comprises an optical imaging system 3 and FIG. 23 illustrates the adapter mounted to the instrument such that the longitudinal axis 17 of the adapter is coaxial with the longitudinal axis of the imaging system 3.

Two mirrors 1a, 1b are shown in FIG. 23 but further mirrors may be present. The mirrors are disposed so as to be in the field of view of the instrument. The mirrors have first foci 71a, 71b, which are angularly spaced around the axis 17, typically in a plane 72 which is perpendicular to the axis 17. The mirrors 1a, 1b are positioned such that there is a three-dimensional region 73 of 3D space comprising a continuous set of points to be obtained in 3D and such that, for every point such as 74 in the region 73, there are at least two straight lines such as 75 and 76 which extend from the point 74 through the respective foci 71a and 71b and such that each line 75, 76 intersects a mirror surface for the first time (at points 77 and 78), which mirror surface is associated with the focus through which the line passes. Where the mirrors 1a, 1b are convex as illustrated in FIG. 23, the points 77 and 78 of first intersection are between the point such as 74 and the foci 71a and 71b. In a case of a concave mirror, for example as illustrated in FIGS. 16(a) and 16(b), the foci lie between the point in the region 73 and the first intersections with a mirror surface.

Provided these conditions are met, then the adapter is capable of functioning as a panoramic three-dimensional adapter. It is not necessary for the region 73 to extend all the way around the longitudinal axis 17. For example, in the two mirror embodiment illustrated in FIG. 13, there would be two such regions effectively defining the regions in which panoramic three-dimensional images of objects can be obtained. In the other embodiments described hereinbefore, the region 73 does extend for a full 360° around the longitudinal axis 17. In all of these embodiments, the region or regions are defined by solid angular ranges and are therefore of infinite volume. However, it is sufficient for there to be a single region of non-zero volume and objects disposed within such a region may be "viewed" three-dimensionally.

INDUSTRIAL APPLICABILITY

A panoramic three-dimensional adapter for an optical instrument of the invention may be used as a stereoscopic panoramic camera or a panoramic stereoscopic projection display when including or mounted to such an adapter.

Examples of applications of such arrangements include:
Video conferencing/lecturing (video presence applications);
Support for Immersive 3D display applications: 3D image acquisition for desktop/large area screen displays, IMAX-style 3D cinemas in the home, 3D-CAD acquisition;
VRML room/building reproduction—single 2D/3D "walkthrough" photographs of rooms in museums, shops, external street/building photography—for websites, motion video etc, estate agents, retailers;
Image acquisition for virtual environments—VR, games, military and civilian aerial reconnaissance, real world data for training simulators, 3D model reconstruction;
Vehicle active cruise/parking control;
All-around 3D home security and monitoring cameras.

The invention claimed is:

1. A panoramic three-dimensional adapter for a single optical instrument, comprising a plurality of mirrors, each of which has a reflective surface whose shape is at least part of the shape formed by rotating a curved non-circular conic section about an axis of symmetry and which has a first focus, each first focus being spaced perpendicularly from a longitudinal axis of the adapter, the first foci being angularly spaced around the longitudinal axis.

2. A panoramic three-dimensional adapter for a single optical instrument, comprising a plurality of mirrors, each of which has a reflective surface whose shape is at least part of the shape formed by rotating a curved non-circular conic section about an axis of symmetry and which has a first focus, each first focus being spaced perpendicularly from a longitudinal axis of the adapter, the first foci being angularly spaced around the longitudinal axis, the axes of symmetry of the mirrors being non-coaxial.

3. A panoramic three-dimensional adapter for use with a single optical instrument, the adapter having a longitudinal axis which is coaxial with an optical longitudinal axis of the instrument when the adapter is used with the instrument, the adapter comprising a plurality of mirrors, each of which has a reflective surface, whose shape is at least part of the shape formed by rotating a curved non-circular conic section about an axis of symmetry, and a first focus, the first foci being angularly spaced around the longitudinal axis of the adapter such that each of the mirrors is in a field of view of the instrument when the adapter is used with the instrument, the mirrors being positioned such that, extending from every point in a three-dimensional region of non-zero volume, there exist at least two straight lines passing through respective ones of the first foci and intersecting for the first time respective ones of the mirror surfaces corresponding to the first foci.

4. An adapter as claimed in claim 1, in which the reflective surfaces have substantially the same shapes.

5. An adapter as claimed in claim 4, in which the reflective surfaces have substantially the same sizes.

6. An adapter as claimed in claim 1, in which the first foci are disposed in a common plane extending perpendicularly to the longitudinal axis.

7. An adapter as claimed in claim 1, in which the first foci are spaced by substantially the same distance from the longitudinal axis.

8. An adapter as claimed in claim 1, in which the first foci are substantially equiangularly spaced around the longitudinal axis.

9. An adapter as claimed in claim 1, in which the axes of symmetry converge towards the longitudinal axis.

10. An adapter as claimed in claim 9, in which the axes of symmetry intersect the longitudinal axis substantially at a common point.

11. An adapter as claimed in claim 10, in which the common point is arranged substantially to coincide with the front principal point of a lens of the optical instrument when the adapter is mounted to the instrument.

12. An adapter as claimed in claim 10, in which each of the mirrors has a convex substantially hyperboloidal reflective surface.

13. An adapter as claimed in claim 10, in which each of the mirrors has a concave substantially ellipsoidal reflective surface.

14. An adapter as claimed in claim 1, in which the axes of symmetry are substantially parallel to the longitudinal axis.

15. An adapter as claimed in claim 14, in which each of the mirrors has a convex substantially paraboloidal reflective surface.

16. An adapter as claimed in claim 1, comprising a substantially non-reflective shield behind the mirrors.

17. An adapter as claimed in claim 1, in which each of the mirrors has an edge which extends further from an apex of the reflective surface at a point of the edge furthest from the longitudinal axis than at least one other point of the edge.

18. An adapter as claimed in claim 1, in which each of the mirrors is spaced from the or each other mirror.

19. An adapter as claimed in claim 1, comprising a mounting for mounting the adapter to the instrument and connected to the mirrors by a rod extending along the longitudinal axis.

20. An adapter as claimed in claim 19, in which the mounting comprises a plurality of spokes radiating from an end of the rod.

21. An adapter as claimed in claim 1, comprising a mounting, for mounting the adapter to the instrument, connected to the mirrors by a substantially transparent cylinder containing the mirrors.

22. An adapter as claimed in claim 21, comprising a substantially non-reflective spike extending along the axis of symmetry from each mirror.

23. A combination of an adapter as claimed in claim 1, and a single optical instrument.

24. A combination as claimed in claim 23, in which the adapter forms part of the instrument.

25. A combination as claimed in claim 23, in which the instrument comprises a camera.

\* \* \* \* \*